United States Patent [19]
Katta et al.

[11] Patent Number: 6,115,421
[45] Date of Patent: Sep. 5, 2000

[54] MOVING PICTURE ENCODING APPARATUS AND METHOD

[75] Inventors: Noboru Katta, Itamishi; Kazuhiko Nakamura, Hirakatashi, both of Japan

[73] Assignee: Matsushita Electric Industrial Co., Ltd., Japan

[21] Appl. No.: 08/847,478

[22] Filed: Apr. 25, 1997

[30]     Foreign Application Priority Data

Apr. 25, 1996   [JP]   Japan .................................... 8-105078
Oct. 23, 1996   [JP]   Japan .................................... 8-280501

[51] Int. Cl.[7] ................................................... H04N 7/12
[52] U.S. Cl. ....................... 375/240; 358/141; 358/133; 364/514 R
[58] Field of Search ................... 348/409, 404, 348/405

[56]     References Cited

U.S. PATENT DOCUMENTS 5,231,484   7/1993   Gonzales et al. ...................... 358/133
5,686,963   11/1997  Uz et al. ................................. 348/404
5,719,632   2/1998   Hoang et al. ........................... 348/419

*Primary Examiner*—Chris S. Kelley
*Assistant Examiner*—Shawn S. An
*Attorney, Agent, or Firm*—Parkhurst & Wendel, L.L.P.

[57]     ABSTRACT

An MPEG2 conforming encoding apparatus and method wherein a control unit adjusts a target number of bits depending on the result of dividing by at least 2 the error between a target number of bits corresponding to the target bit rate and the number of generated bits required for encoding an immediately preceding image segment group, and controls a quantizing parameter for encoding the image segment group in accordance with the adjusted target number of bits.

31 Claims, 22 Drawing Sheets

COMPLEXITY

NUMBER OF BITS GENERATED

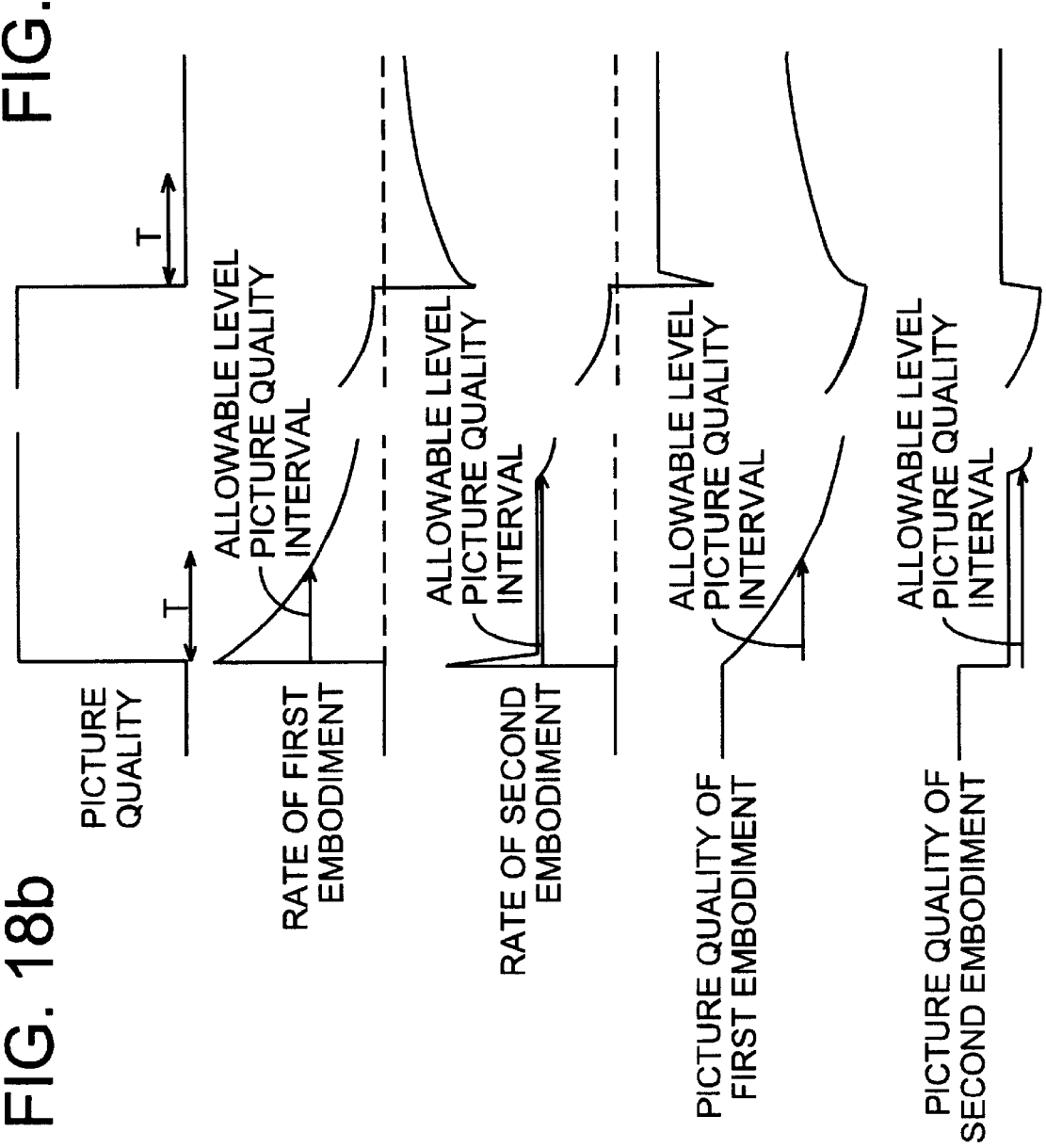

MOVING PICTURE ENCODING APPARATUS AND METHOD

TECHNICAL FIELD

The present invention relates to a method and apparatus for digital compression encoding of images, such as video signals, and more particularly to an apparatus and method for controlling the quantizing width when encoding and/or controlling the number of bits generated.

BACKGROUND OF THE INVENTION

An international standard for compressing image signals and converting same into a digital code is known as ISO/IEC 13818-2, also known as MPEG2. A typical method of digital encoding image signals conforming to that format is shown in Test Model 3 of ISO-IEC/JTC/SC29/WG11 No. 328. FIG. 1 of the present drawings is a block diagram of a typical MPEG2 video encoding apparatus. This MPEG2 video encoding apparatus comprises a frame converter 101 for shuffling input video signal into encoding sequence, a block converter 102 for converting picture data into encoding units called macro blocks, a subtractor 103 for determining the difference between an input macro block and a predicted value with respect to its image data, a DCT (discrete cosine transform) 104, a quantizer 105, a variable length encoder 106, an inverse quantizer 107, an IDCT (inverse discrete cosine transform) 108, a motion compensation block 109, a mode discriminator 110, a motion detector 111, a quantizer control block 112, an encoder buffer 113, and an adder 114.

Prior to explaining the operation of the above-described MPEG2 video encoding apparatus, a data structure for image encoding is described with reference to FIG. 2.

Each picture of an image to be encoded is divided into macro blocks and encoded. The picture is an image of, for example, a frame or field unit, and unless otherwise noted in the following description, a frame is referred to as a picture. The macro block is a data area of 16×16 pixels, and the luminance and color difference signals are respectively encoded in blocks of 8×8 pixels each.

One data unit called a slice is composed of a plurality of macro blocks, and one picture is composed of a plurality of slices. The picture consists of an I picture encoded using information only from itself, a P picture predicted from a past picture in time, and a B picture predicted from both past and future pictures in time. The picture configuration in FIG. 2 is a typical example in which a P picture, three pictures ahead, is predicted by using a first I picture, and B pictures are arranged on both sides of the P picture. Therefore, when encoding, it is necessary to first encode the I picture, then the P picture, and then the B pictures, which requires rearrangement of images in the original time direction.

Furthermore, with a plurality of pictures starting from an I picture, a group of pictures (GOP) is composed, and one video sequence is composed of an arbitrary number of GOPs. Thus, again, the macro block is defined as an image segment, and the slice, picture, and GOP composed of a plurality of macro blocks may be defined as image segment groups. Supposing the GOP to be an image segment group, then for example, a picture that is a smaller image segment group may be defined as a sub-set of a GOP or image segment group.

With the understanding of the above-described data structure, the operation of the MPEG2 video encoding apparatus of FIG. 1 is described below.

An input signal is fed into the frame converter 101, and the sequence of pictures of input image is converted. The output of the frame converter 101 is supplied to the block converter 102, and the block converter 102 divides the entered image into macro blocks of 16×16 pixels each, and supplies those macro blocks to the subtractor 103. In the subtractor 103, the predicted value obtained from the motion compensation block 109 is subtracted from the signal supplied from the block converter 102, and a predicted error is determined. That predicted error is transformed in the DCT 104 into each block of 8×8, and each resulting transformed coefficient is quantized in the quantizer 105 thereby creating quantized data. The quantized data is variable length encoded in the variable length encoder 106, and compressed encoded data is thereby created. The compressed encoded data is, in order to be transmitted at a desired transmission rate, stored in the encoder buffer 113, and thereafter issued.

The data quantized in the quantizer 105 is reproduced in the inverse quantizer 107 and IDCT 108 to produce a predicted image. The reproduced image data is passed to the motion compensation block 109, and a predicted value is calculated and supplied to the subtractor 103. The motion detector 111 calculates the motion vector in every macro block, and the motion vector is supplied to the motion compensation block 109, and is also supplied to the variable length encoder 106. The quantizer control block 112 compares the number of generated bits in the bit stream transmitted from the variable length encoder 106 and a target number of generated bits converted from a target bit rate, and controls the quantizing width of the quantizer 105 so that encoding is finally completed with the target number of bits.

Processing in the quantizer control block 112 is described below. The target number of bits per GOP converted from the target bit rate is G, the number of bits left over in this GOP in the process of encoding is R, the number of generated bits of the image of I, P, and B pictures encoded immediately before are respectively SI, SP, SB, and the averages of quantizing parameters at this time are respectively QI, QP, QB. Thus, the difficulty in encoding each picture XI, XP, XB is respectively defined as XI=SI×QI, XP=SP×QP, XB=SB×QB, and the target number of bits for encoding each picture is calculated, with respect to I, P and B pictures, as follows:

$$TI = \frac{R}{1 + \frac{NP \cdot XP}{XI \cdot Kp} + \frac{NB \cdot XB}{XI \cdot Kb}} \quad (1)$$

$$TP = \frac{R}{NP + \frac{Kp \cdot NB \cdot XB}{XP \cdot Kb}} \quad (2)$$

$$TB = \frac{R}{NP + \frac{Kb \cdot NP \cdot XB}{XB \cdot Kp}} \quad (3)$$

where Kp, Kb are constants, and NP, NB are the numbers of remaining P pictures and B pictures not yet encoded. The value of R is updated at R=R−S, supposing the number of bits generated in the picture to be S, and is updated at R=R+G at the beginning of the GOP. That is, the number of bits generated per GOP is determined, bits are assigned and encoded depending on the composition ratio of each picture, the number of generated bits is determined in each picture, the value is subtracted from R, the target number of generated bits is corrected and assigned in each picture again, and the same procedure repeats. Further, when the number of bits required for encoding one GOP is different from the target number of bits assigned in the GOP, either one is assigned in the target number of generated bits in the next GOP.

The method of controlling the quantizing parameters from the target number of generated bits of each picture is described below. First, virtual buffers are assumed for I, P and B pictures, and supposing the target number of generated bits in each macro block is constant when encoding an i-th macro block, the data remainders of the virtual buffers dIi, dPi, dBi are expressed as follows.

$$dIi = dI0 + B_{i-1} - TI \times (i-1)/MB\_cnt \quad (4)$$

$$dPi = dP0 + B_{i-1} - TP \times (i-1)/MB\_cnt \quad (5)$$

$$dBi = dB0 + B_{i-1} - TB \times (i-1)/MB\_cnt \quad (6)$$

where Bi is the number of generated bits in all preceding macro blocks including i, MB_cnt is the number of macro blocks contained in one picture, and dI0, dP0, dB0 are initial values of buffer remainders at the beginning of each picture. In these formulas, the second term, i.e., $B_{i-1}$, refers to the number of bits required to encode up to the immediately preceding macro block, and the third term, i.e., $T_i \times (i-1)/MB\_cnt$, expresses the target number of bits required to encode up to the immediately preceding macro block. Therefore by calculating the difference between the second term and third term, the error between the number of bits actually required for encoding and the target number of bits is obtained. By adding this error to the initial value of the buffer remainder, the buffer remainder for encoding the i-th macro block is obtained.

Using the buffer remainder calculated in the above formulas, the quantizing parameter Qi in the i-th macro block is obtained as follows.

$$Qi + di \times \frac{31}{r} \quad (7)$$

where r=2×(target bit rate)/(picture rate).

Summarizing then regarding a target bit rate, the target number of generated bits is set in a picture unit, and the number of generated bits is limited to the target number of the bits in the GOP unit in which the picture is included. Then, for each macro block, depending on the error between the actual number of generated bits and the target number of bits, assuming that the number of generated bits is constant, the quantizing parameter is controlled. As a result, the image is encoded so that the code generation amount may be close to the target number of generated bits for each picture.

In such an encoding method, however, the number of generated bits is set in the picture unit, and the quantizing parameter is controlled so that the number of generated bits coincides with the target number of generated bits in the GOP unit in which the picture is included. Therefore when the picture changes suddenly and the number of bits required for encoding increases, the quantizing parameter is controlled to increase the quantizing width so as to suppress the target number of bits. As a result, the picture quality may deteriorate.

Or, if the actual number of generated bits increases considerably from the target number of generated bits in a certain GOP, the quantizing parameter is controlled so that the target number of generated bits in next GOP may absorb this error, and the picture quality in that GOP may likewise deteriorate.

Yet, when relatively simple images are concentrated in a first half of a certain picture and complicated images are concentrated in a second half thereof, it is ideal to assign more bits to the second half. In the above method, however, the target number of bits is uniformly assigned in each macro block, and the quantizing parameter is set depending on the error from the number of bits required actually in each macro block, and hence there is a possibility of assigning more bits in the first half and occurrence of more bits than expected in the second half. Furthermore, if complicated images are concentrated in the first half of a picture, the number of bits generated in the first half is limited, and bits are not ideally assigned.

To overcome the problems described above, it is possible to encode once all images, determine the ideal bit distribution for all those images, and encode again. However, it is difficult to provide such encoding in real time.

OBJECT OF THE INVENTION

It is therefore an object of the present invention to provide a moving picture encoding apparatus and method capable of distributing bits appropriately depending on the difficulty in encoding the moving picture.

It is another object of the present invention to provide a moving picture encoding apparatus and method for setting an appropriate quantizing width by distributing bits appropriately without once encoding all images.

It is yet another object of the present invention to provide a moving picture encoding apparatus and method for determining target bits to be generated to absorb the error between the target number of generated bits to be generated in one image segment composed of a plurality of pictures, such as a GOP, and the number of actually generated bits, gradually over a plurality of image segment groups.

It is a further object of the present invention to provide a moving picture encoding apparatus and method for controlling the target quantity of generated bits so that the target quantity of generated bits does not change abruptly in adjacent picture segment groups.

It is a further object of the present invention to provide a moving picture encoding apparatus and method capable of controlling an optimum quantizing width on the basis of the target number of generated bits to be generated in one image segment group.

SUMMARY OF THE INVENTION

According to the present invention, the error between the target number of generated bits to be generated in one image segment and the number of actually generated bits is distributed to the target quantity of generated bits to be generated in each one of other plural image segment groups.

Also according to the present invention, if the number of bits generated at the time of encoding a sub-set of a certain image segment is out of a predetermined range, the quantizing parameter for encoding the sub-set of a subsequent image segment is set to a value different from the preceding quantizing parameters.

BRIEF DESCRIPTION OF THE DRAWINGS

FIGS. 18a–c are timing charts explaining the correlation of the complexity of encoding a picture, number of generated bits, and picture quality.

DETAILED DESCRIPTION OF THE PREFERRED EMBODIMENTS OF THE INVENTION

Figure 1:
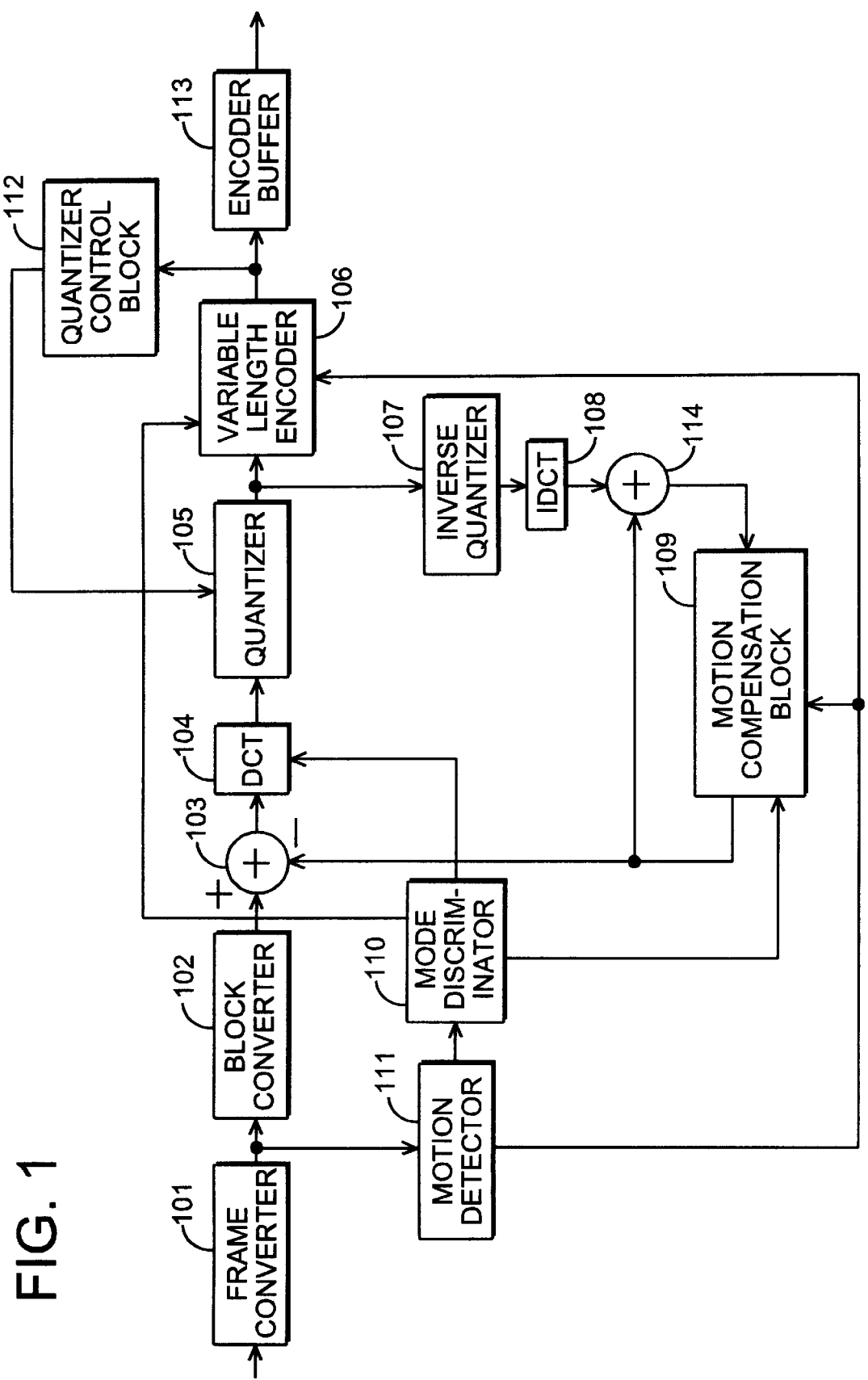
FIG. 1 is a block diagram of an example of a general MPEG2 encoder.
Figure 2:
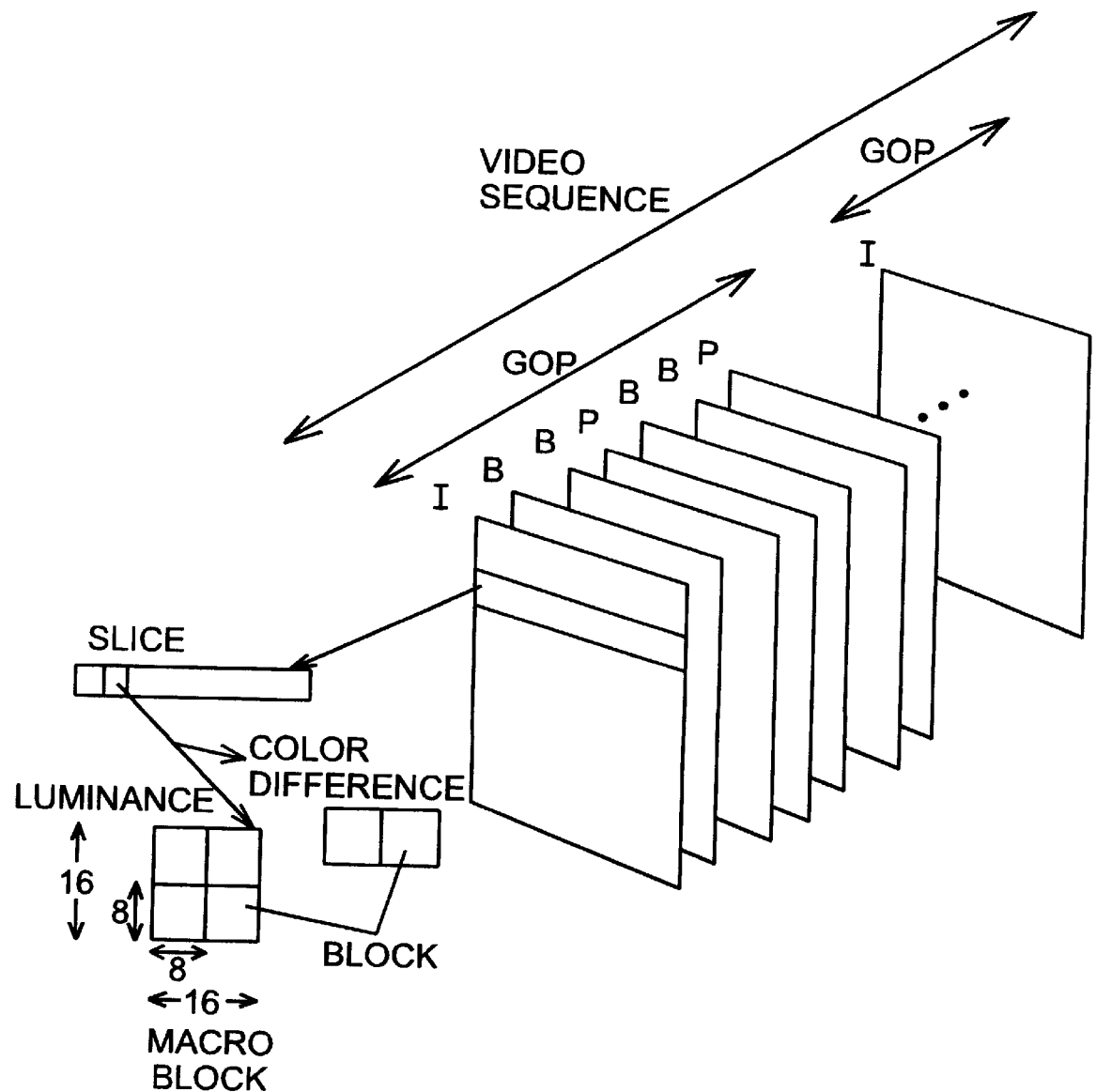
FIG. 2 is a schematic diagram showing a picture configuration according to MPEG2.
Figure 3:
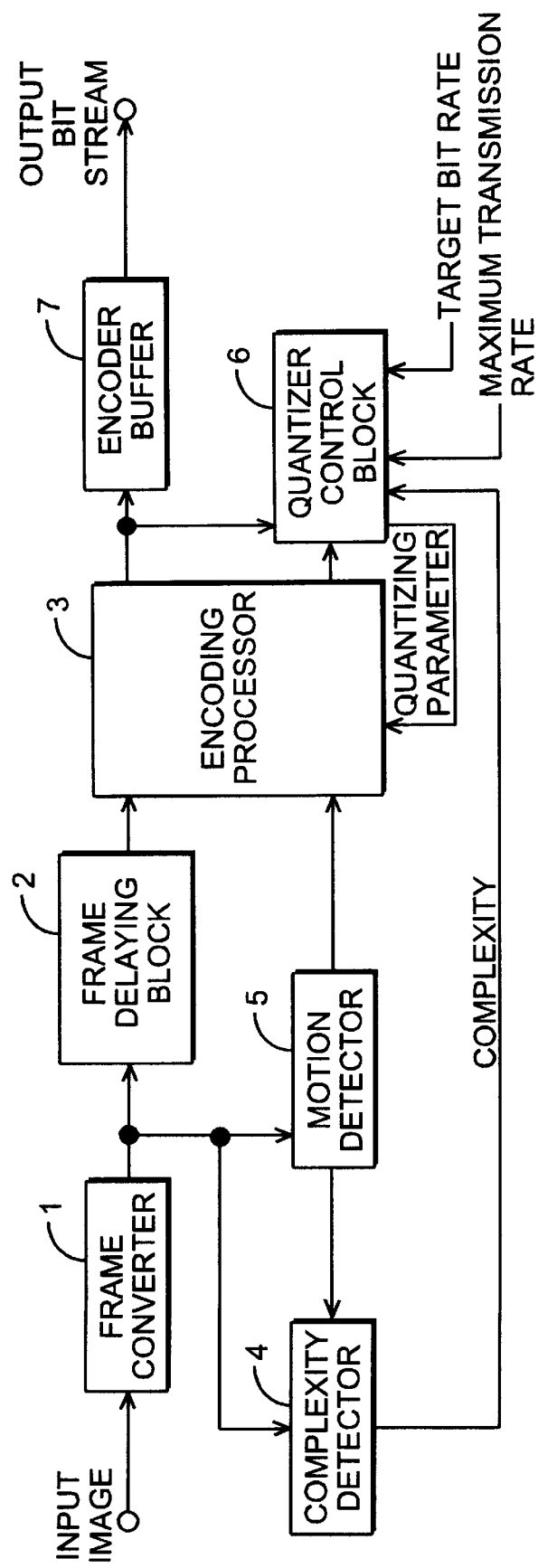
FIG. 3 is a block diagram showing a first embodiment of the invention.

FIG. 3 is a block diagram showing an example of a moving picture encoding apparatus according to the present invention, in which there is a frame converter 1, a frame delaying block 2, an encoding processor 3, a complexity detector 4 for analyzing the input image and calculating the difficulty in encoding, a motion detector 5, a quantizer control block 6, and an encoder buffer 7. The encoding processor 3 comprehensively includes the actions of the block converter 102, subtractor 103, DCT 104, quantizer 105, variable length encoder 106, inverse quantizer 107, IDCT 108, motion compensation block 109, mode discriminator 110, and adder 114 of the typical moving picture encoding apparatus shown in FIG. 1.

Input images are shuffled in image encoding sequence in the frame converter 1. The motion detector 5 calculates the motion vector for each macro block by comparison with each reference picture, that is, P picture and B picture. This motion vector is sent into the encoding processor 3, and is used for creating predicted images with motion compensation. The motion vector is also supplied to the complexity detector 4.

Figure 4:
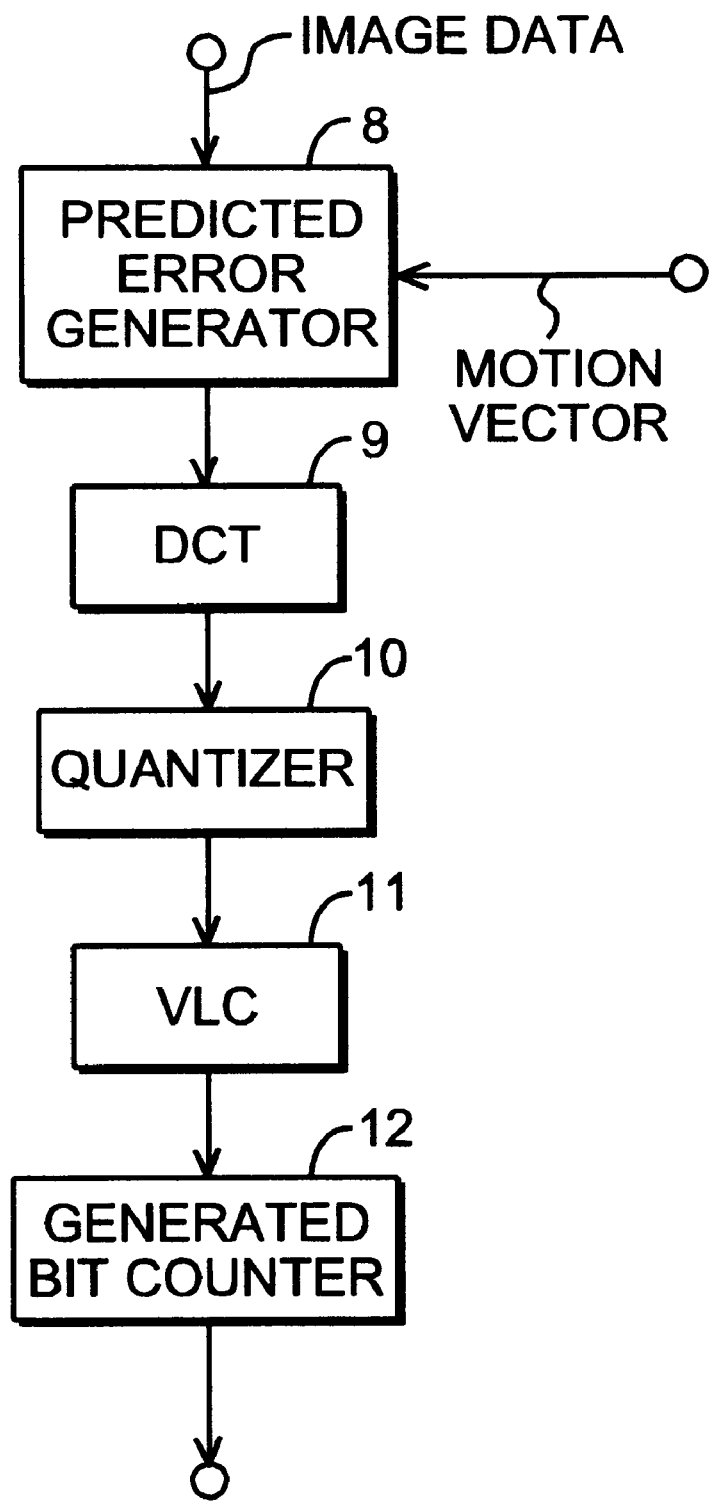
FIG. 4 is a block diagram showing an example of the complexity detector 4 of FIG. 3.

FIG. 4 is a block diagram showing an example of the complexity detector 4. The complexity detector 4 comprises a predicted error image generator 8, a DCT 9, a variable length encoder 11, and a generated bit counter 12. The image data from the frame converter 1 is supplied to the predicted error image generator 8 together with a motion vector signal. In the predicted error image generator 8, if the input image is an I picture, the image is held as is, and in the case of a P picture, with the motion vector from the motion detector 5, a predicted error image is created by the difference between the predicted image and the input image. Similarly, in the case of a B picture, a predicted error image is created from predicted results from past and future pictures.

In the DCT 9, the image is successively transformed in each block, quantized in the quantizer 10, and encoded in the variable length encoder 11. At this time, the quantizer 10 quantizes always with a constant quantizing parameter. The value of the quantizing parameter (q_scale) may be an arbitrary value, and herein quantizing is processed at q_scale=10 for the sake of convenience. The generated bit counter 12 detects the number of bits of the encoded data in every macro block, multiplies that number by a fixed value of q_scale, and calculates complexity showing the difficulty of encoding each macro block. The generated bit counter 12 sums the complexity values of each macro block and supplies the complexity per picture to the quantizer control block.

With reference again to FIG. 3, the input image is delayed by the portion of one picture in the frame delaying block 2, and is supplied to the encoding processor 3. The encoding processor 3 encodes the same just as the moving picture encoding apparatus shown in FIG. 1, according to the encoding parameter supplied from the quantizer control block 6, and generates a bit stream conforming to the MPEG2 standard.

The quantizer control block 6 determines the quantizing q_scale on the basis of the number of generated bits of the bit stream from the encoding processor 3, the complexity from the complexity detector 4, and the target bit rate, and further determines the quantizing width when encoding in the encoding processor 3.

Figure 5:
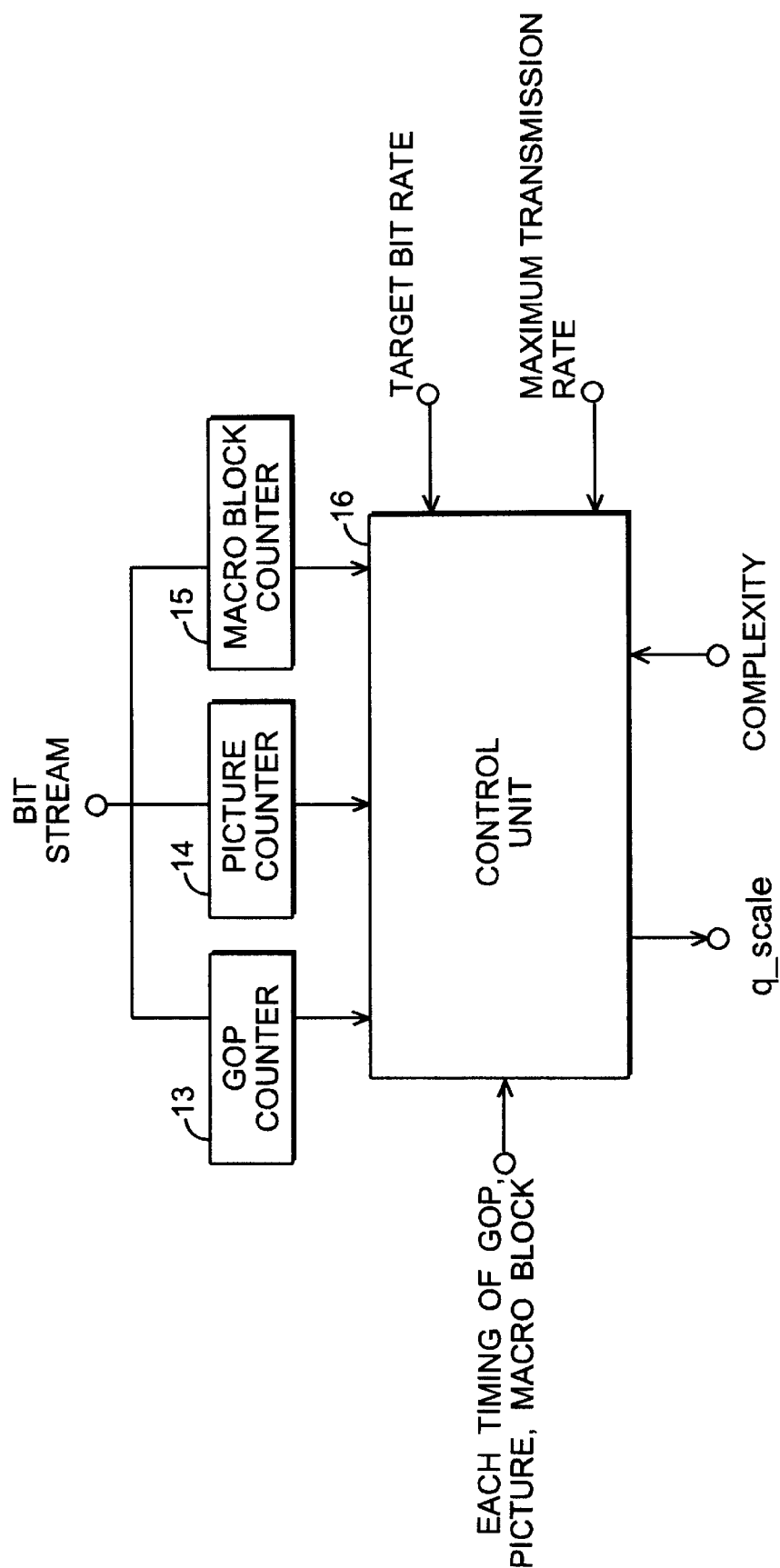
FIG. 5 is a block diagram showing an example of the quantizer control block 6 of FIG. 3.

FIG. 5 shows a block a diagram of an example of the quantizer control block 6. The quantizer control block 6 comprises a generated bit counter 13 for counting the number of bits generated in the bit stream for the portion of one GOP generated by the encoding processor 3, a generated bit counter 14 for counting the number of generated bits for the portion of one picture, a generated bit counter 15 for counting the number of generated bits for the portion of one macro block, and a control unit 16. The control unit 16 generates the quantizing parameter q_scale in every macro block on the basis of the number of generated bits obtained from the generated bit counters 13, 14, 15, the target bit rate, maximum transmission rate Dec_R when sending a bit stream to a video decoder, and the complexity obtained from the complexity detector 4.

Figure 6A:
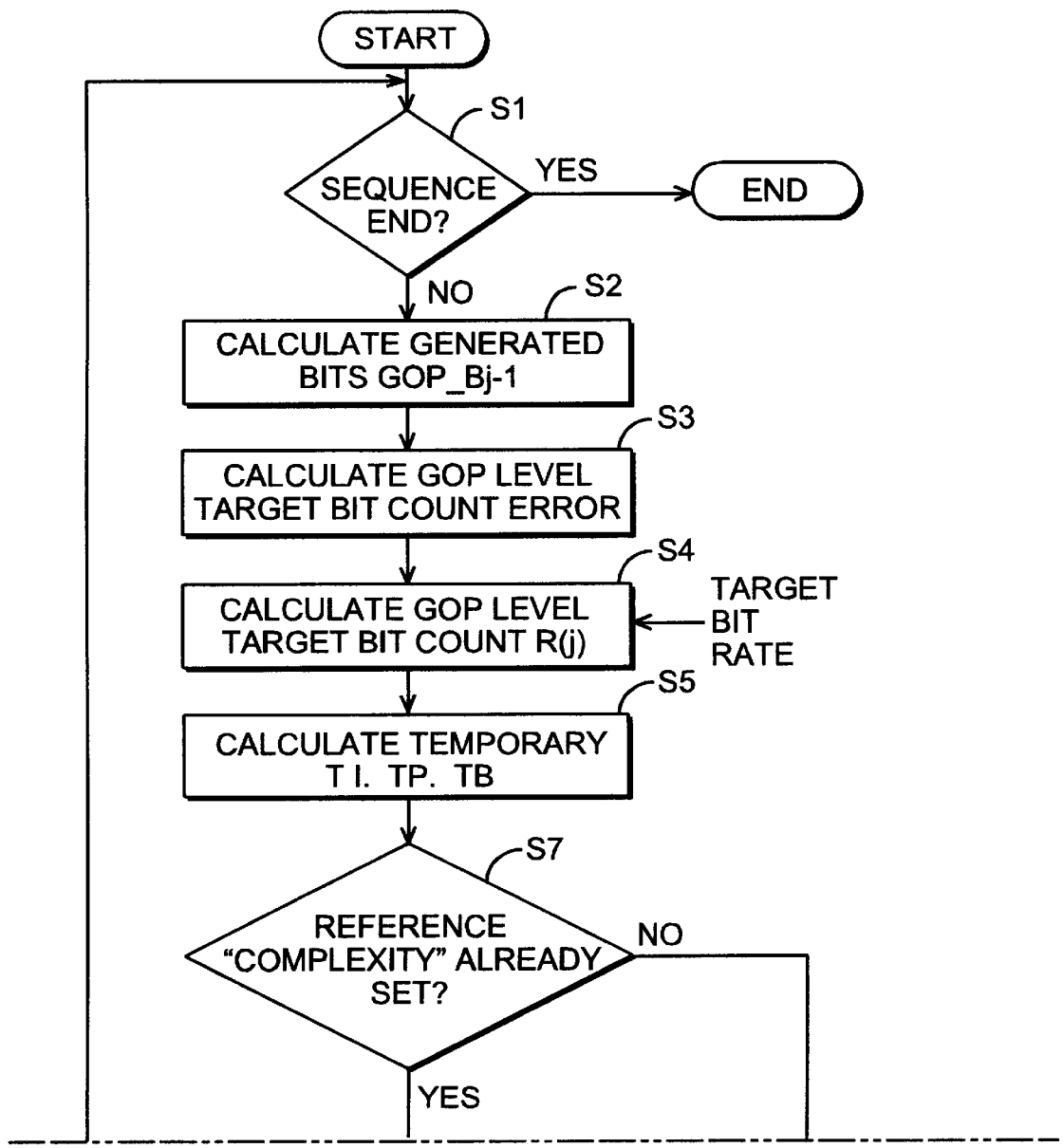
FIG. 6 is flowchart showing a calculating method for a quantizing parameter by the control unit 16 of FIG. 5.
Figure 6B:
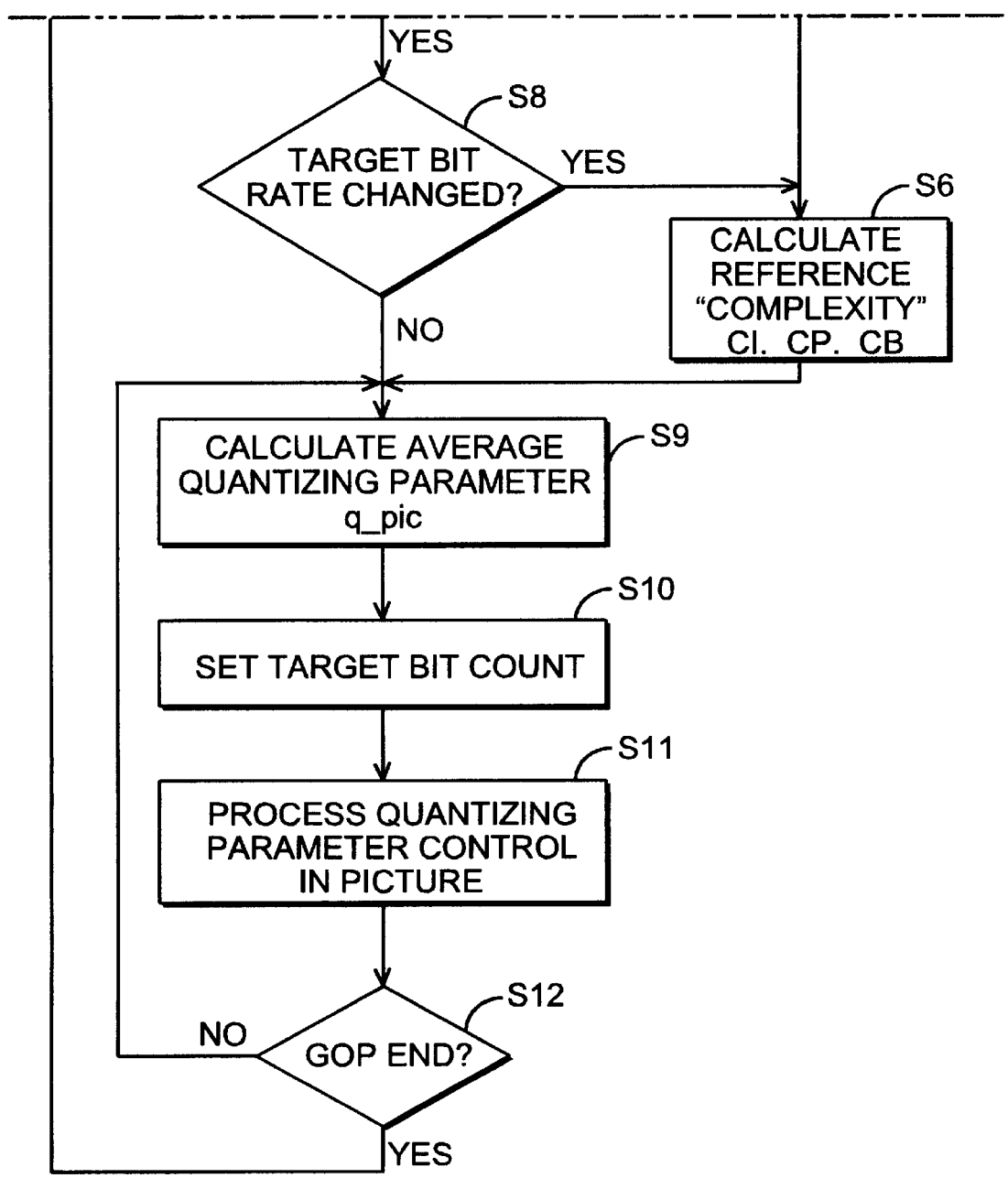

FIG. 6 is a flowchart showing an example of an algorithm for calculating q_scale performed in the control unit 16.

First, at step S1, it is judged if a sequence end code is detected or not, and if not detected, the process goes to step S2. At step S2, when encoding a j-th GOP, the number of generated bits $GOP\_B_{j-1}$ in the immediately preceding GOP is read out from the generated bit counter 13. That number is 0 in the first GOP. Next, at step S3, the error $DIF\_G_j$ between the number of generated bits immediately before encoding the j-th GOP and the target number of bits G, calculated by supposing that all GOPs generate the same number of bits, is calculated by the following formula.

$$DIF\_Gj = DIF\_G_{j-1} + GOP\_B_{j-1} - G \qquad (8)$$

where Dif__G1=0. For example, if a GOP comprises 15 frames of images and one GOP expresses a moving picture for 0.5 second, then in this case, G is ½ of the target bit rate, that is, the bit rate transferred per second.

At the next step S4, when encoding the j-th GOP, the target number of generated bits R(j) is calculated by the following formula.

$$R(j) = G - \frac{1}{T} \times DIF\_Gj \qquad (9)$$

where T is a constant of 2 or more. This formula means that the error DIF__Gj between the number of bits generated in a certain GOP and a present target number of bits G is not immediately absorbed by the target number of bits assigned in the next GOP, but is controlled to absorb part of the error DIF__Gj, that is, 1/T only. Since encoding is successively done in the sequential GOPs, in the adjusting process of target bits for each GOP, the error component is gradually absorbed in the target number of bits in the subsequent GOPs, so that a sudden increase or decrease in the target number of bits is alleviated. As for the value of T, an effect may be expected at a numerical value of 2 or more, but to adjust the target number of bits for several seconds, if one GOP is composed of about 15 frames of images, a proper value is somewhere between 10 and 30. Of course, if adjusting the target number of bits for several minutes, an even larger value may be used such as, for example, 180.

Once the target number of generated bits per GOP is determined, then, at step S5, temporary values of target number of generated bits per picture TTI, TTP, TTB are calculated in the following formulas.

$$TTI = \frac{XI}{XI + \frac{NP \cdot XP}{KP} + \frac{NB \cdot XB}{Kb}} \times R(j) \qquad (10)$$

$$TTP = \frac{XP}{XP + \frac{NP \cdot XP}{KP} + \frac{NB \cdot XB}{Kb}} \times R(j) \qquad (11)$$

$$TTB = \frac{XB}{XI + \frac{NP \cdot XP}{KP} + \frac{NB \cdot XB}{Kb}} \times R(j) \qquad (12)$$

where XI, XP, XB are predicted values of complexity of each picture, and wherein their ratio is important herein. Those values may be the complexity in the final I, P, B, pictures of the immediately preceding GOP obtained from the complexity detector 4, or a fixed value, for example, XI:XP:XB=160:60:42. NP, NB are, respectively, the number of P pictures and B pictures in the GOP. Kp and Kb are constants for correction determined from the quantizing matrix, and, for example, are herein Kp=1.0, Kb=1.4.

In I, P, B pictures, consequently at step S6, CI, CP, CB are set as the reference complexity of reference difficulty in encoding. Step S6, however, is skipped when the reference complexity is already read in and the target bit rate is not changed as a result of a judging routine at step S8 and step S9, and the immediately preceding value is directly the set value. Setting the quantizing parameter q__scale at 10, the reference complexity is set at such a value that the number of bits generated when encoded by this quantizing parameter may be equal to the temporary values TTI, TTP, TTB of the target number of generated bits.

Next, at step S9, the average quantizing parameter q__pic is set when encoding so that the reference complexities CI, CP, CB may be the number of generated bits of TTI, TTP or TTB in the picture at that point.

At step S10, the target numbers of generated bits TI, TP, TB of the picture to be encoded are set. Using the complexity supplied from the complexity detector 4, the number of bits necessary when encoded at the set q__pic is set as TI, TP, TB.

At step S11, the quantizing parameter in the picture is controlled, and this step is further described below.

Finally at step S12, it is judged if the GOP end code has been detected or not, and if GOP end code is not detected, the process from step S9 is repeated, and if a GOP end code is detected, the process returns to step S1.

The process from determination of temporary target number of generated bits TTI, TTP, TTB (step S5) through determination of target numbers of generated bits TI, TP, TB (step S10) is described below with reference to the graph in FIG. 7.

Figure 7:
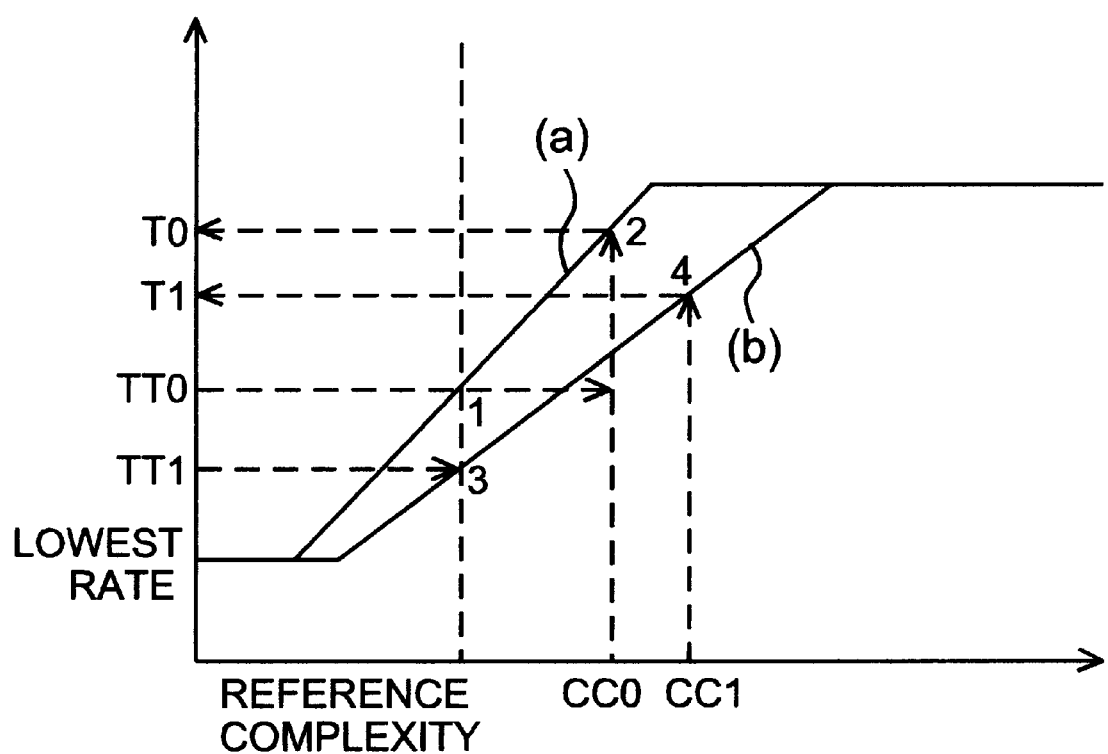
FIG. 7 is a graph schematically showing a calculating method for a quantizing parameter.

In the graph of FIG. 7, the abscissa denotes complexity, indicating the difficulty in encoding, and the ordinate represents the number of generated bits. When quantized at q__scale=10, the relation between complexity and number of generated bits is expressed by line a. In the first picture, the intersecting point of the temporary target number of generated bits TT0 per picture and line (a) is the reference complexity. The complexity in the next picture is detected by the complexity detector 4, and supposing the value is CC0, the target number of generated bits of that picture is T0 as shown in the graph. The target number of generated bits per picture is determined depending on the complexity obtained from the complexity detector 4, and the same operation is repeated until one GOP is completed.

When processing for one GOP is over, the target number of generated bits R(j) assigned to the next GOP is determined by formula (9). Consequently, depending on the target number of generated bits for a newly assigned GOP, the temporary target number of generated bits of each picture obtained in formulas (10) to (12) varies. At this time, supposing the temporary target number of generated bits is TT1, a line (b) passing through the intersection of TT1 and reference complexity is newly drawn. When the complexity obtained from the complexity detector 4 is CC1, the target number of bits T1 at the intersection of line (b) and CC1 is the target number of bits of the picture at this moment.

The plotted line in FIG. 7 has upper and lower limit values. The upper limit value is determined in the following formula, supposing the data remainder in the reproduction side decoder buffer is VBV__fullness, the initial value is 1.8M bits as the buffer capacity of a standard decoder, and the picture rate is Pic__R:

$$VBV\_fullness = VBV\_fullness - B\_pic + \frac{Dec\_R}{Pic\_R} \qquad (13)$$

where B__pic is the number of generated bits of the encoded picture detected by the generated bit counter 14, and Dec__R is the maximum rate to be entered in the decoder. Alternatively, the upper limit is the smallest of the temporary values TTI, TTP, TTB of the target number of generated bits determined in formulaes (10) to (12) and VBV__fullness.

On the other hand, the lower limit value of the plotted line of q__scale is determined empirically so that the bit rate is not less than 2 Mbps.

The detail of the control of q__scale in every macro block by the quantizing parameter control of the picture at step S11 in the flowchart of FIG. 6 is described below.

Figure 8:
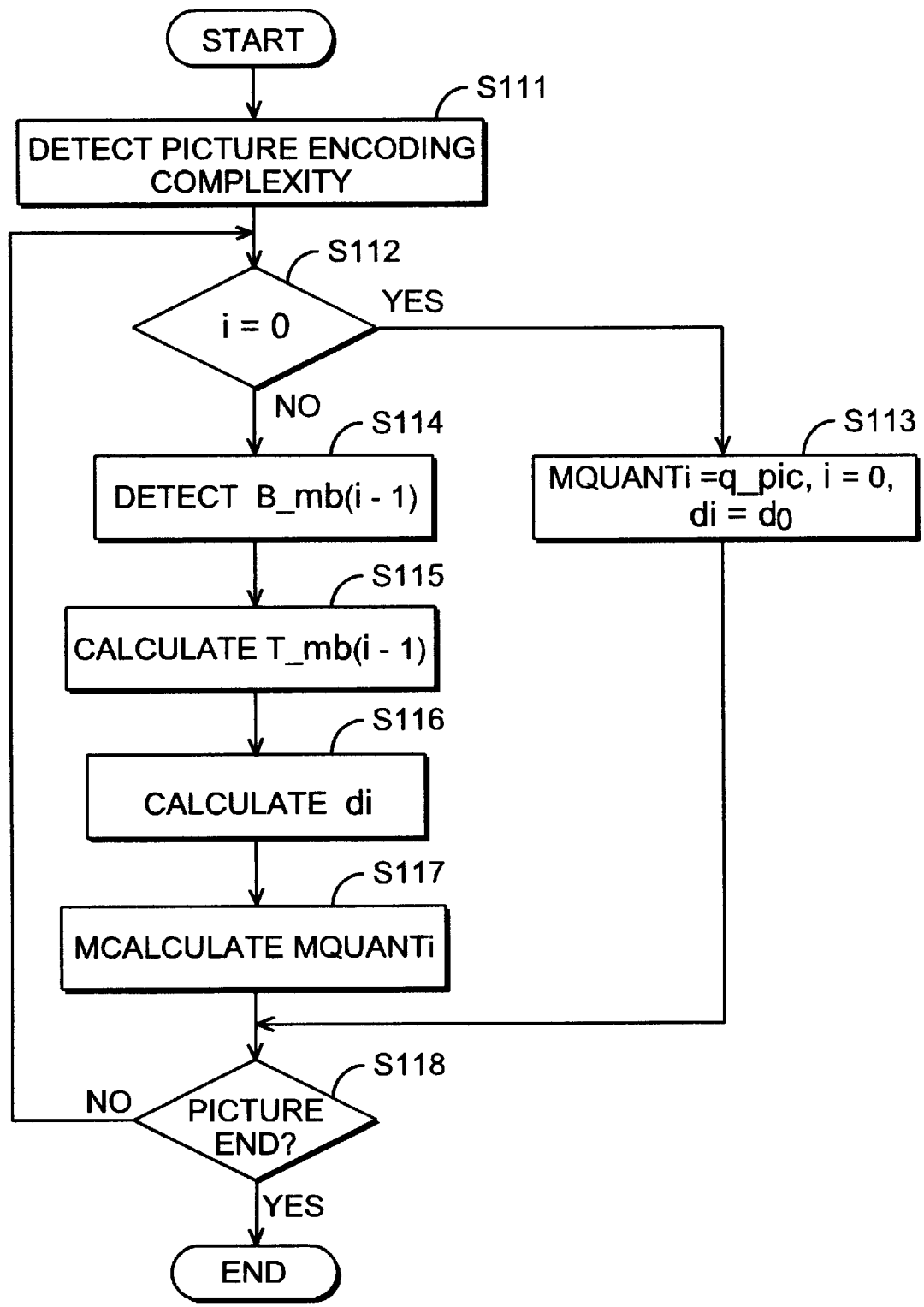
FIG. 8 is a flowchart explaining a calculating method for a quantizing parameter in each picture.

FIG. 8 is a flowchart for explaining the quantizing parameter control process in the picture. Here, the value of quantizing parameter q_scale in an i-th macro block is MQUANTi, the virtual buffer for rate control is defined, and the data remainder before encoding of the i-th macro block is supposed to be di. The initial value of di is determined in $$d0 = q\_pic \times \frac{r}{31} \quad (14)$$

where r is the reaction parameter, and herein defined as $$r = 2 \times (\text{target number of generated bits of picture}). \quad (15)$$

First at step S111, the complexity of the entire picture, C_pic is read. At step S112, it is judged if the macro block is first or not. If judged to be a first macro block, then at step S113, MQUANTi, the value of quantizing parameter q_scale of the first macro block is set to q_pic, di=d0.

If not judged to be a first macro block, the data remainder di before encoding this macro block is determined in the following method.

First, at step S114, the number of bits generated in the immediately preceding macro block B_mb(i-1) is read from the generated bit counter 15. Next, at step S115, C_mb(i-1) is determined as the complexity of the immediately preceding macro block from the complexity detector 4, and the number of bits T_mb (i-1) predicted to be generated in the immediately preceding macro block is determined by the following formula.

$$T\_mb(i-1) = \frac{C\_mb(i-1)}{C\_pic} \times T\_pic \quad (16)$$

where T_pic is T1 in the case of 1 picture, TP in the case of P picture, or TB in the case of B picture. At step S116, di is determined by the following formula, $$di = d(i-1) + B\_MB(I-1) - T\_MB(I-1) \quad (17)$$

At step S117, MQUANTi is determined by the following formula, and is supplied into the encoding processor 3.

$$MQUANTi = di \times \frac{31}{r} \quad (18)$$

The setting of a quantizing matrix in every macro block is repeated until the end of the picture according to the judging routine at step S118.

In summary, then, by the reference complexity in every picture calculated from the target bit rate, the temporary target numbers of generated bits TTI, TTP, TTB are determined, the target number of generated bits is corrected from the temporary value in the correlation between the reference complexity and the complexity in the picture at that point obtained from the complexity detector 4, and therefore the number of bits may be assigned accordingly if there is a scene change or a region of intense action in the picture, or when the complexity increases abruptly.

Further, the error from the number of generated bits controlled depending on the complexity in every picture and the target generated bits is adjusted over multiple GOPs, and the effect of bit distribution in a GOP immediately after a certain GOP is lessened.

Figure 9A:
FIGS. 9a–b are timing charts schematically explaining an increase or decrease in the number of bits generated per GOP at advanced complexity of encoding.
Figure 9B:
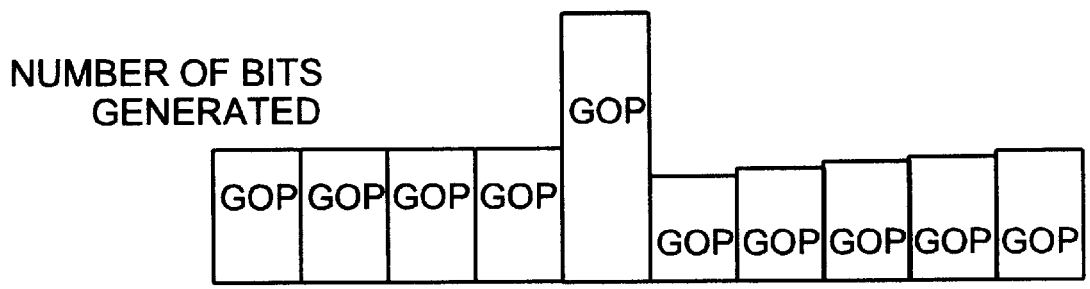

For example, FIG. 9 schematically shows the changes of the number of generated bits in GOP units in the case of a momentary increase of complexity in the image of a constant complexity. In FIG. 9(a), for a specific period, an image of a specific complexity continues, and then the complexity suddenly increases at a certain point, and then an image of a specific complexity continues again. In the conventional assigning method of number of generated bits due to sudden change in complexity, extremely few bits are assigned. In this embodiment, by contrast, it is understood that changes in the target number of generated bits in the GOP right after are small. That is, if the number of generated bits in a certain GOP is doubled, only 1/T of the error from the target number of generated bits of that GOP has an effect on the target generated bits of the next GOP. Supposing T=20, if one GOP is supposed to compose an image for 0.5 second, almost all bit rates are recovered to the target bit rate in 10 seconds.

Figures 10A, 10B, 10C:
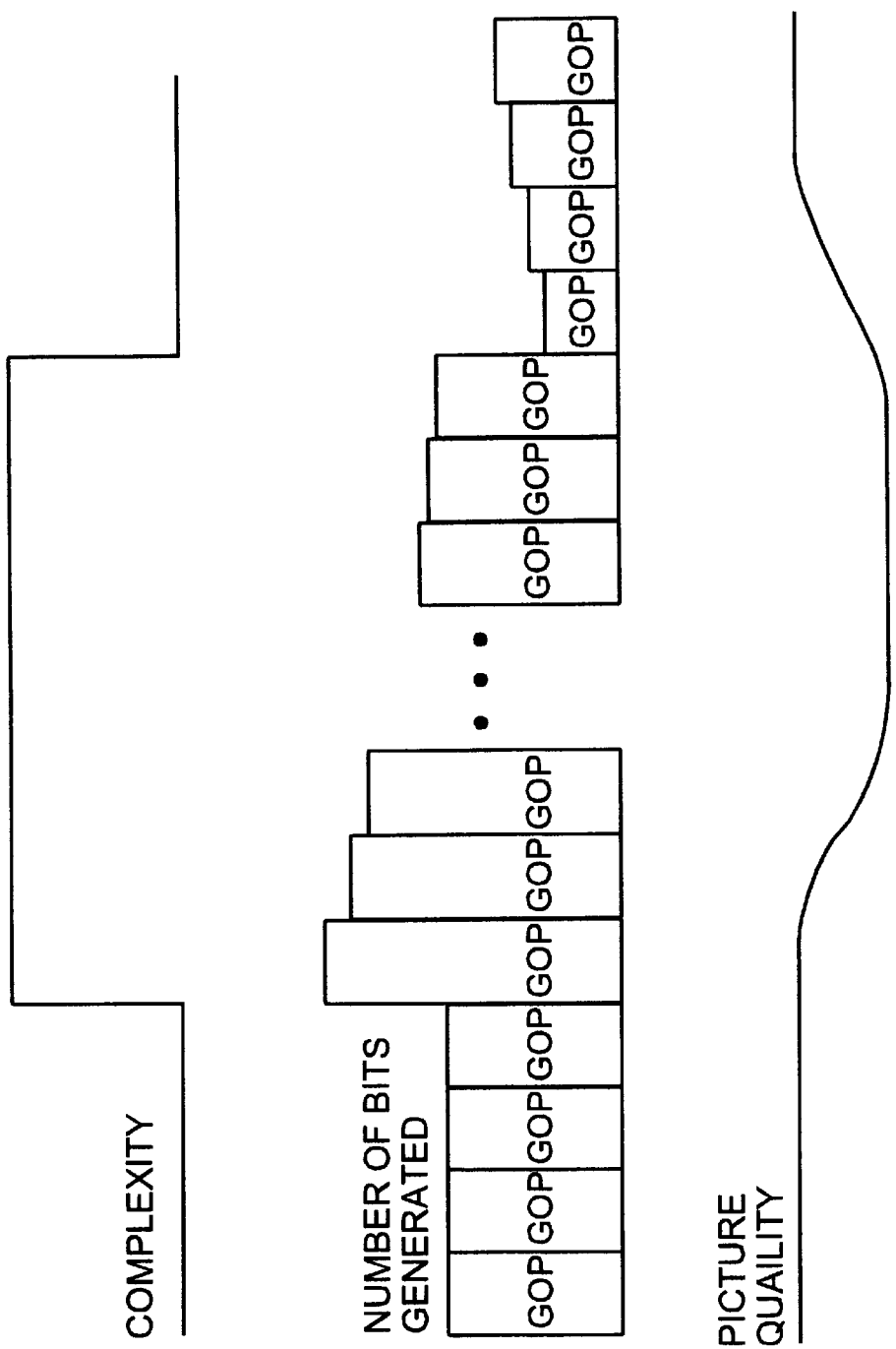
FIGS. 10a–c are timing charts schematically explaining changes in the number of bits generated per GOP and picture quality in the case of an extended duration of information of advanced complexity of encoding.

FIG. 10 schematically shows the mode of deterioration of picture quality in terms of the number of bits generated in every GOP and the quantizing width when an image of constant complexity continues, and is succeeded by an image of relatively complicated and constant complexity, then succeeded by an image of the initial complexity. That is, when the complexity increases, the number of generated bits of GOP increases in order to maintain the picture quality, but it is correct to the number of generated bits for maintaining the bit rate exponentially. At this time, the picture quality will not deteriorate suddenly, but it declines continuously for a period of several seconds. When returning to the initial complexity, the number of bits generated in the immediately succeeding GOP decreases, but it also returns to the optimum number of generated bits exponentially. At this time, the picture quality can be continuously recovered for a period of several seconds from the picture quality for which encoding was difficult.

It is also possible to control continuously the picture quality if the target bit rate is changed as a function of the type of encoding. That is, if the target bit rate is decreased, the reference set value of complexity decreases also at the same rate. Therefore, if encoded at a target rate, the temporary target number of generated bits for the next picture also decreases nearly in proportion to the target number of generated bits, and therefore, the average quantizing parameter of the picture is nearly the same as in the case when the target number of generated bits is directly maintained, and it changes exponentially in the subsequent pictures.

Moreover, according to the present embodiment, since the quantizing width per macro block is also controlled depending on the complexity of each macro block in the picture, and therefore the error from the target bit rate is small, the picture can be encoded in an appropriate bit distribution.

Figure 11A:
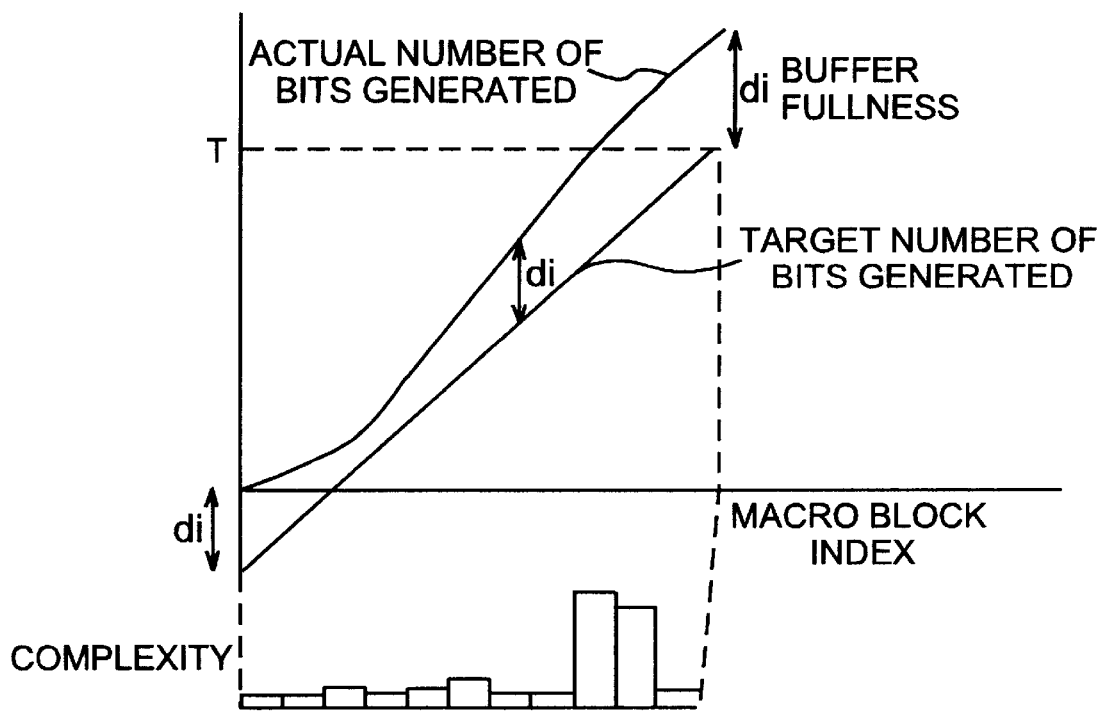
FIGS. 11a–b are timing charts comparing the target number of bits generated per macro block and the number of generated bits for a conventional method and the method according to the first embodiment of the invention.
Figure 11B:
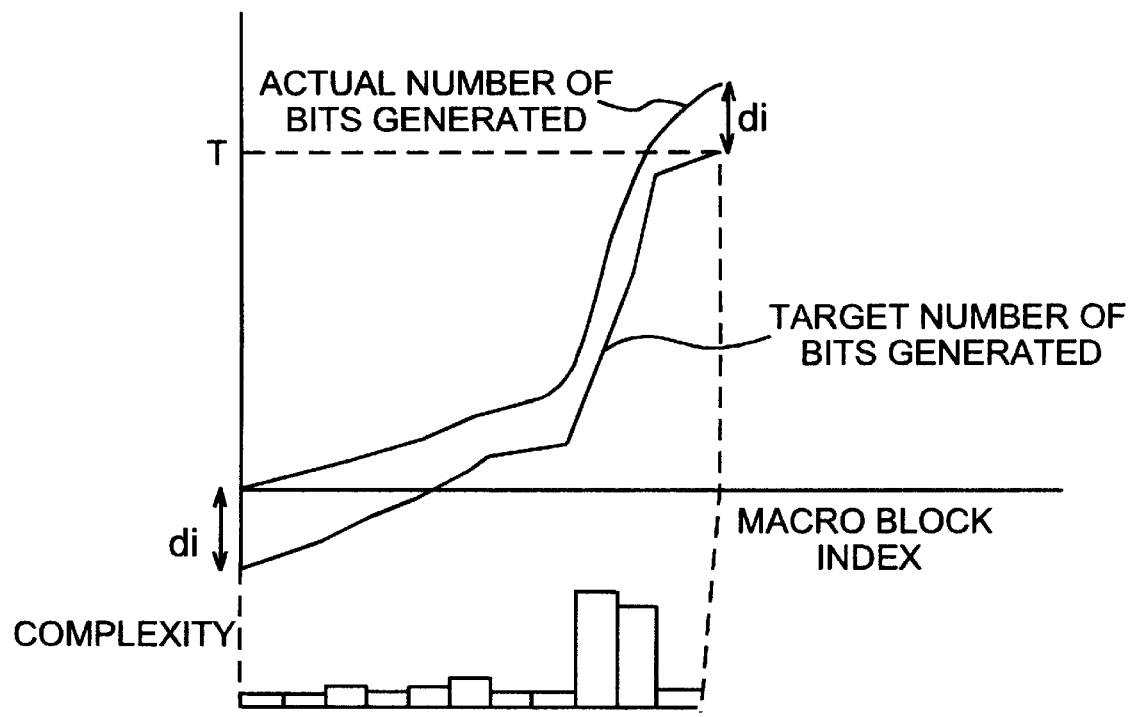

FIG. 11 schematically compares control of the quantizing parameter by the conventional method and control of the quantizing parameter in the present embodiment. FIG. 11(a) shows the actual number of generated bits and target number of generated bits in the conventional method, and FIG. 11(b) shows the actual number of generated bits and target number of generated bits in the method of the invention.

When the target number of generated bits T in a certain picture is set, according to the conventional method, assuming the number of bits generated in each macro block to be uniform, the difference from the actual number of generated bits was defined as the data remainder of the virtual buffer, and the quantizing parameter was controlled accordingly. Therefore, in the image having the peak of complexity in the latter half of the image, the actual bit generation amount is small in the first half of the image, and hence the quantizing parameter decreases, so as to be encoded at higher picture quality than the initially demanded picture quality. In the latter half of the image, however, the bit generation amount increases, and finally the number of bits may be larger than the target number of generated bits, or the quantizing parameter may increase suddenly due to the increase of the buffer remainder, which may lead to deterioration of picture quality.

On the other hand, according to the present embodiment, since the target number of generated bits in each macro block is set as in formula (16) depending on the complexity, the bit distribution is close to the complexity distribution in the picture, so that both picture quality and number of generated bits are close to the target.

In the present embodiment, the difference between the target bit rate and the number of generated bits is determined in the GOP unit, and the target number of generated bits is corrected, but that difference may be also determine in a picture unit or other unit. That is, the macro block, the minimum value of the processing unit of encoding in this embodiment, may be defined as an image segment, and a set of image segments, such as slice, picture and GOP may be defined as an image segment group, so that the target number of generated bits may be corrected in the unit of an arbitrary image segment group.

As for setting of a reference value of complexity of encoding, not limited to setting by using q_scale=10, other quantizing parameters may be used, or if the target bit rate is not changed, a fixed value may be set from the outset.

Figure 12:
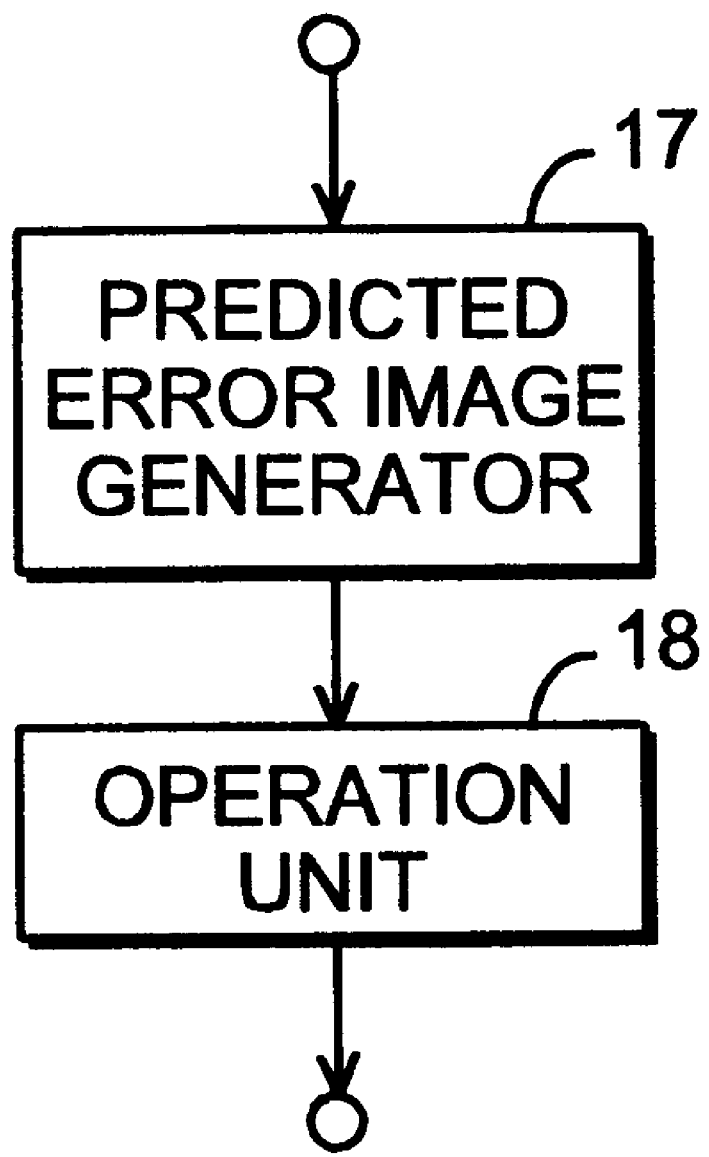
FIG. 12 is a block diagram showing another example of determining complexity of encoding.

Instead of using the complexity for determining the quantizing parameters, other indices may be used. For example, activity calculated from the square sum of error between the average and each picture's pixel values may replace complexity in each formula. FIG. 12 is a block diagram for achieving this embodiment in which activity is used. A predicted error image generator 17, like that shown in FIG. 4, generates the I picture as is, and P and B pictures from the predicted errors. An operation block 18 determines the square error of each macro block from the predicted error image from the predicted error image generator 17. The total is used as the substitute for the complexity of the entire picture.

In this embodiment, the quantizer control block 6 is explained as a structure independent of the encoding processor 3, but when the encoding apparatus itself is composed of a DSP (digital signal processor), it may be used commonly with a block for other processing functions, e.g., complexity detector or motion detector.

Figure 13:
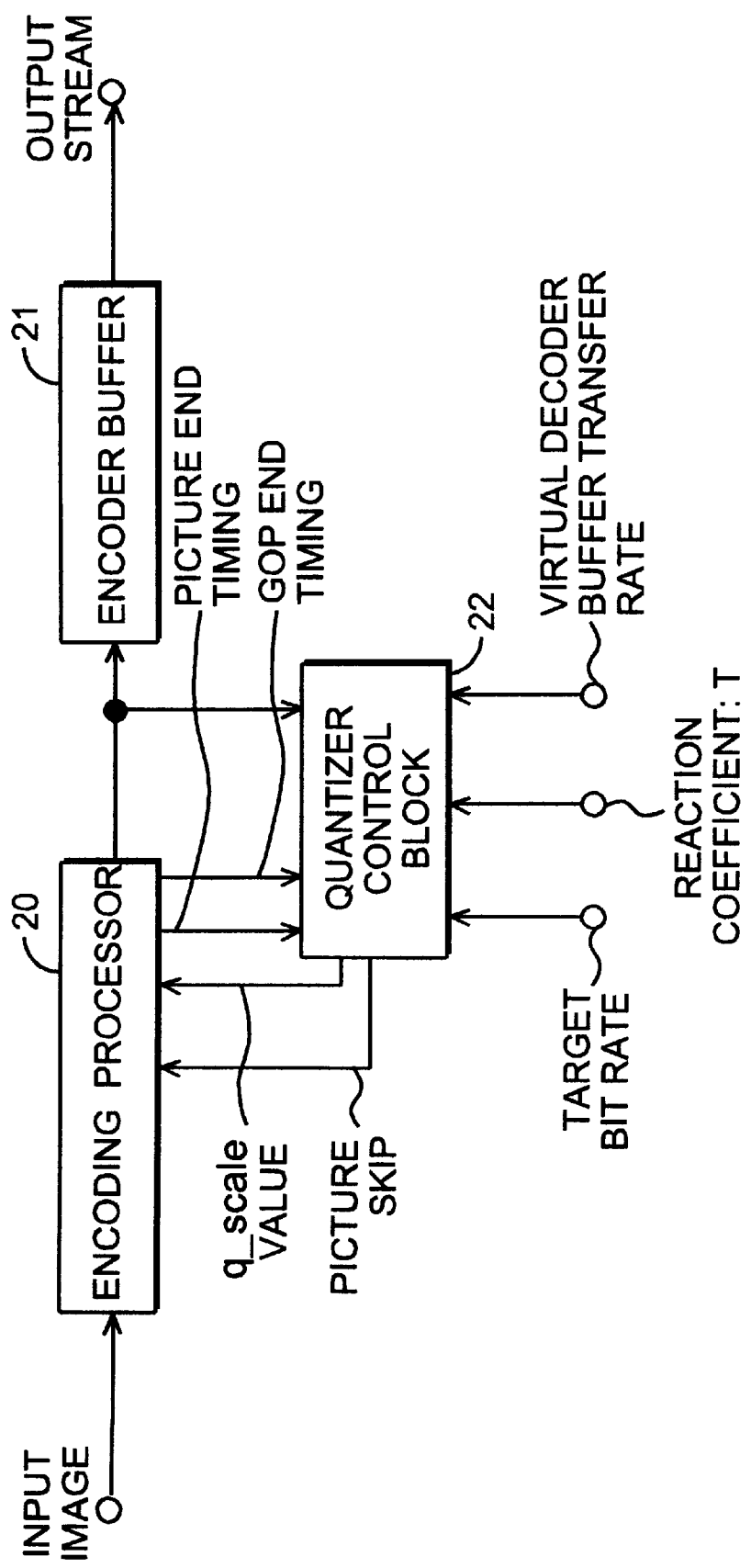
FIG. 13 is a block diagram showing a second embodiment of the invention.

A second embodiment of the present invention is described below. FIG. 13 is a block diagram showing a second embodiment of the invention, in which an input signal is supplied to an encoding processor 20. The encoding processor 20 encodes each macro block into a signal conforming to MEPG2 according to the value of quantizing width q_scale indicated by a quantizer control block 22, and supplies the encoded signal to an encoder buffer 21 and the quantizer control block 22. The encoding processor 20 also supplies the received GOP end timing signal and picture end timing signal to the quantizer control block 22. The quantizer control block 22 determines the quantizing width q_scale from the target bit rate, reaction coefficient T, and encoded data and timing signal supplied from the encoding processor 20, and supplies the quantizing width q_scale to the encoding processor 20, and controls the number of generated bits and picture quality.

Figure 14:
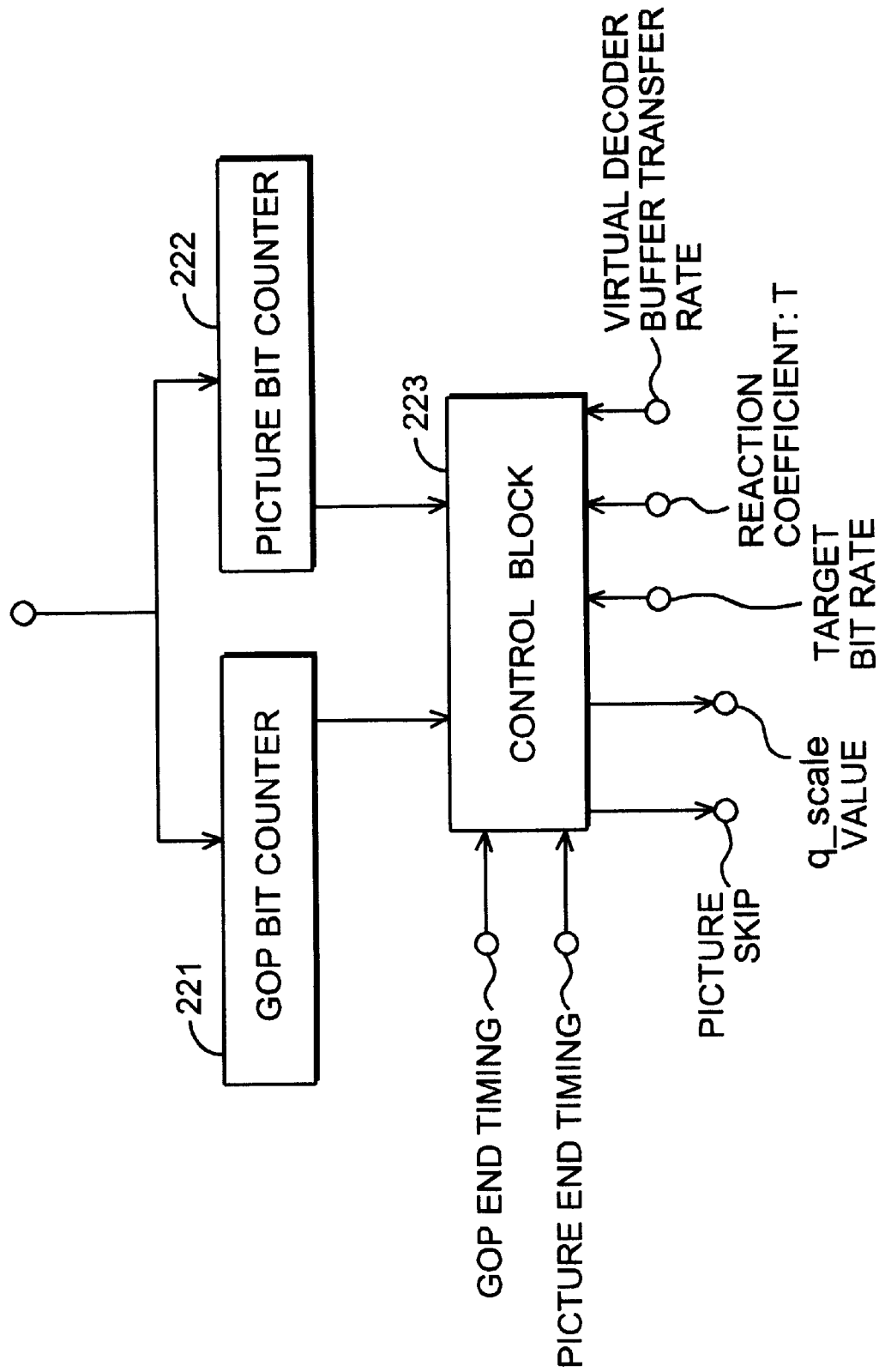
FIG. 14 is a block diagram showing an example of the quantizer control block 22 of FIG. 13.

FIG. 14 is a block diagram showing an example of the quantizer control block 22 of FIG. 13. The quantizer control block 22 includes a GOP bit counter 221 for counting the number of bits generated in every GOP, a picture bit counter 222 for counting the number of bits generated in every picture, and a control unit 223 for calculating q_scale. To the GOP bit counter 221 and picture bit counter 222, encoded data is supplied from the encoding processor 20, and the number of generated bits is counted. The control unit 223 detects the number of bits generated in every GOP or picture whenever receiving the GOP end timing signal and picture end timing signal, and calculates q_scale from the target bit rate (R) and reaction coefficient (T).

Figure 15A:
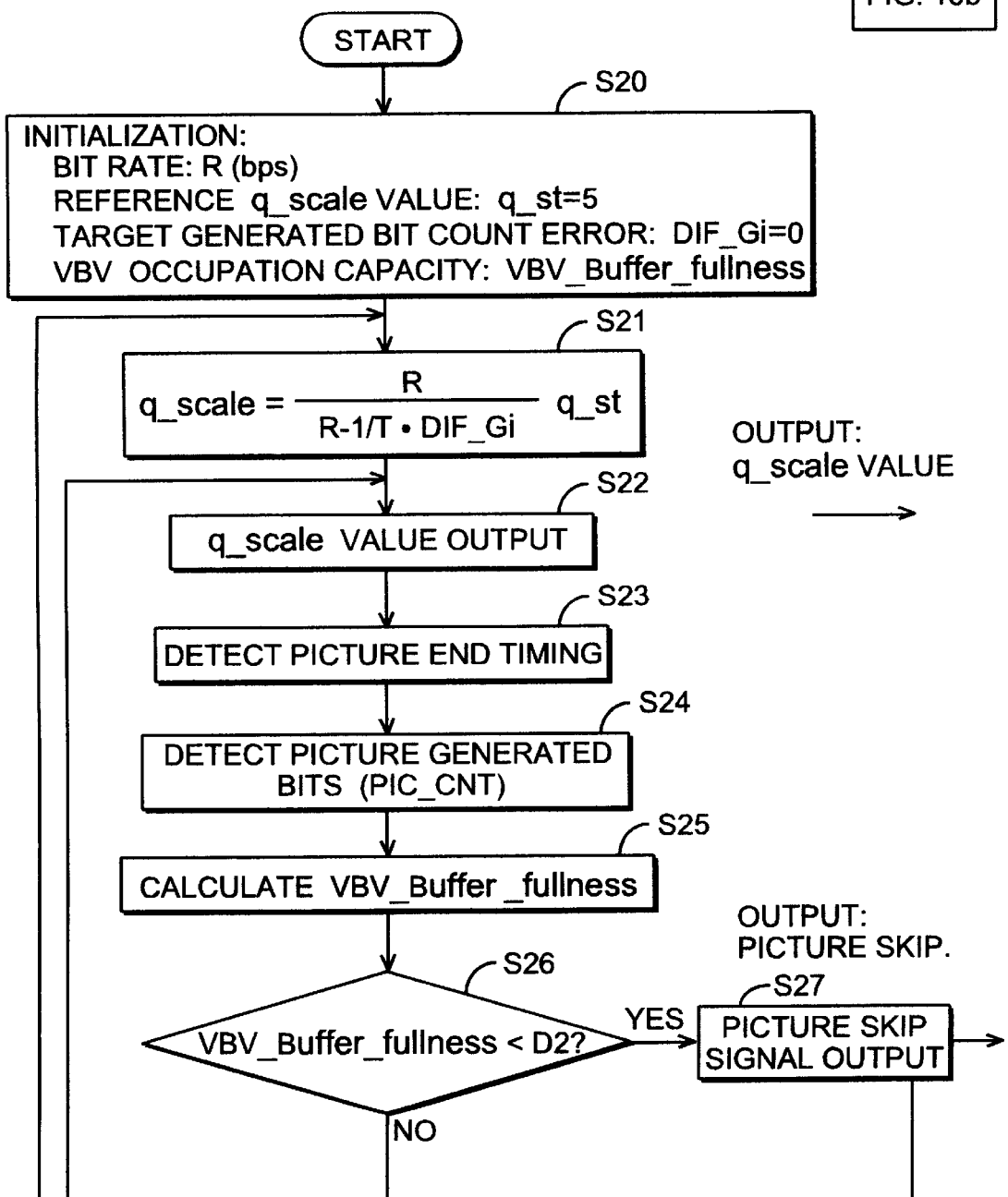
FIG. 15 is a flowchart depicting a calculating method for a quantizing parameter by the control unit 223 of FIG. 14.
Figure 15B:
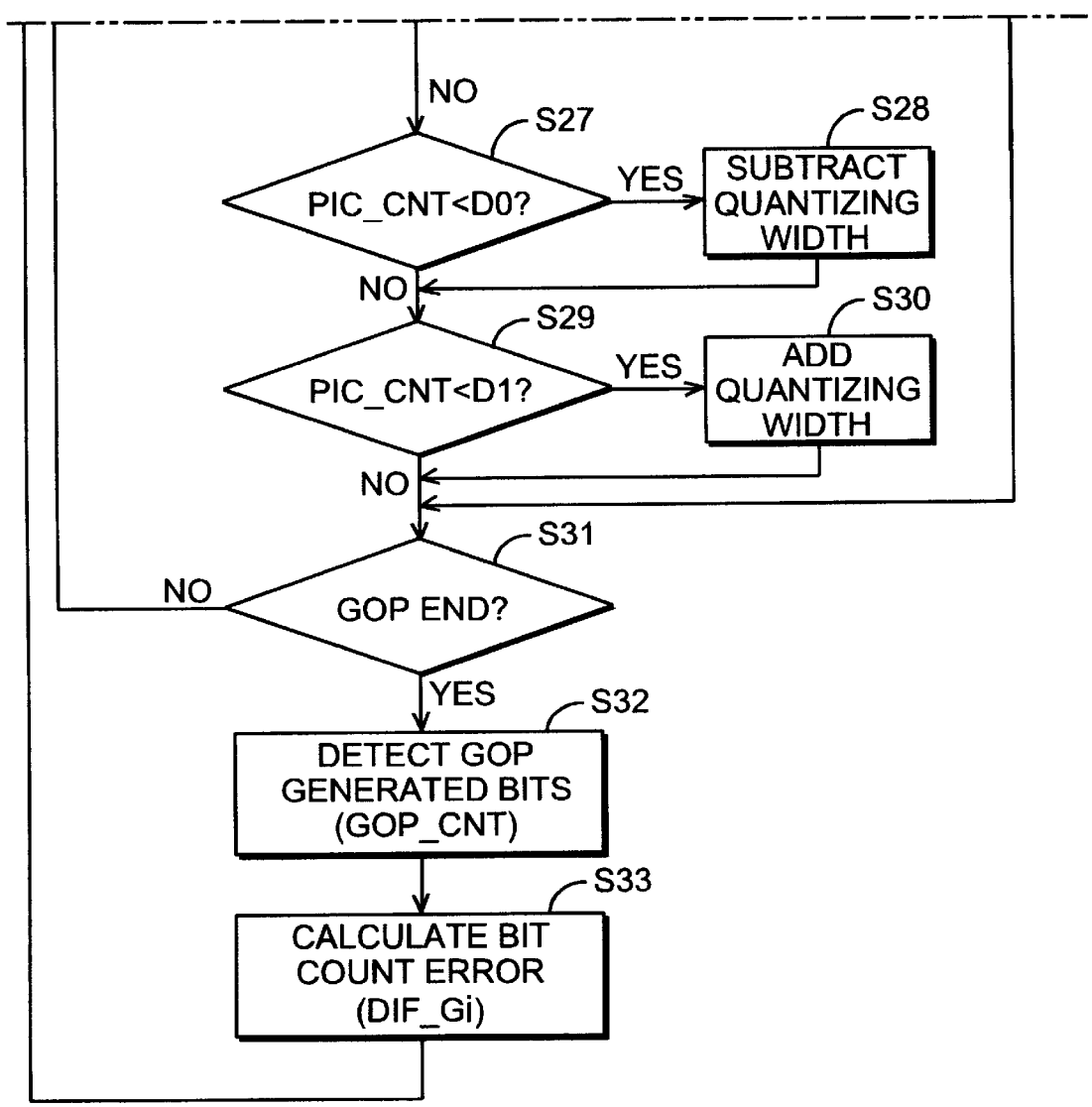

FIG. 15 is a flowchart depicting an exemplary method of calculating q_scale by the quantizer control block 22.

At initial processing, at step S20, the error DIF_Gi between the target number of generated bits per GOP calculated from the target bit rate R (bps) and the present number of generated bits, reference value q_st of q_scale, and virtual buffer occupation capacity VBV_Buffer-fullness of the decoder are all set. The minimum number of generated bits per picture D0 is set at 1,000,000 bits/picture rate, and the maximum number of generated bits D1 is set at 8,000,000 bits/picture rate. The set value of D0 is determined from the empirical rule that the picture quality drops significantly when the encoding rate drops below 1 Mbps. On the other hand, the maximum value D1 may be matched with the data transmission rate that the decoder of the reproducing apparatus is capable of supporting. Or, D1 may be set at an arbitrary value around or below that supported transmission rate.

Next, at step S21, q_scale of the picture to be encoded is calculated according to the following formula.

$$q\_scale = q\_st \times \frac{R}{R - \frac{1}{T} \times DIF\_Gi} \quad (19)$$

If, however, larger than the preceding q_scale by 2 or more, q_scale should be set to a value larger than the preceding q_scale by 2. As is evident from the formula, when DIF_Gi is equivalent to T times the target bit rate R, q_scale diverges infinitely, and indeed the upper limit of the error DIF_Gi is limited by the value of reaction coefficient T. That is, the reaction coefficient T is a parameter for determining the allowable range of the error DIF_Gi.

Also, as is clear from the formula, all quantizing parameters for encoding a certain picture can be obtained from past quantizing parameters. Q_scale obtained at step S21 is supplied to the encoding processor 20 at step S22.

At step S23, picture end timing is detected. When picture end timing is detected, at step S24, the number of bits generated in picture PIC_CNT is detected. On the basis of the result of that detection, at step S25, the fullness of the virtual buffer is determined in the following formula.

VBV_Buffer_fullness=VBV_Buffer_fullness−PIC_CNT+R/(picture rate) (20)

If, however, the right side exceeds the capacity of virtual buffer (fullness_MAX), then VBV_Buffer_fullness=fullness_MAX.

At step S26, it is judged if VBV_Buffer_fullness is below the lower limit D2 of the buffer fullness of the reproducing side decoder or not, and if below the lower limit D2, a picture skip processing signal is issued at step S27 to avoid underflow.

Figure 16:
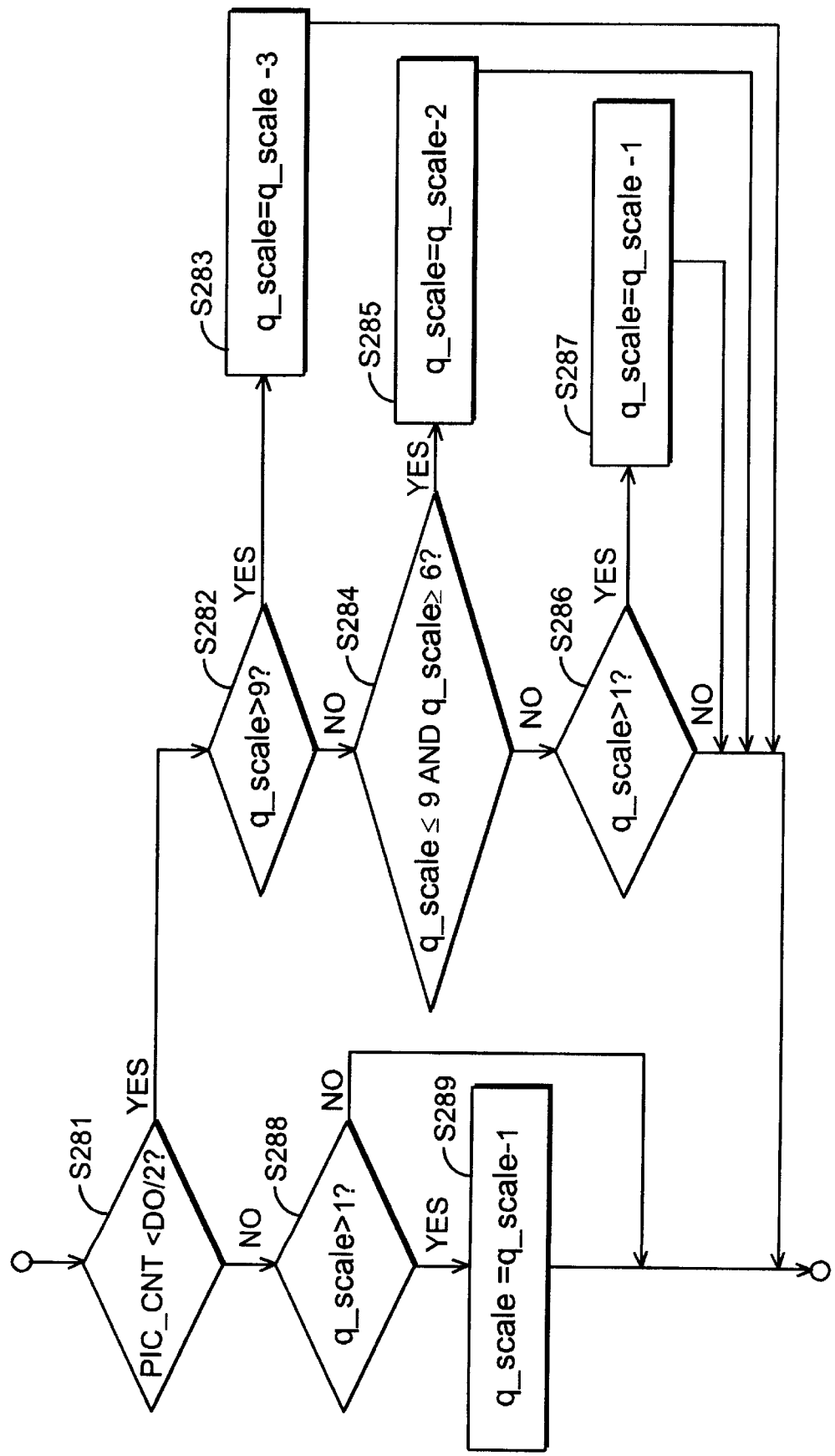
FIG. 16 and FIG. 17 are flowcharts showing further calculating methods by the control unit 223 for a quantizing parameter.

At step S27, PIC_CNT is judged whether it is below the lower limit D0 and when PIC_CNT is smaller than the lower limit D0, at step S28, q_scale is decreased so that the number of bits may not be smaller than the lower limit in the subsequent pictures. FIG. 16 is a flowchart for explaining the operation for setting q_scale to be used in a subsequent picture when the number of bits generated per picture is below the lower limit D0. Usually, q_scale is decremented by one, but if PIC_CNT is significantly smaller than the lower limit, for example, if less than ½ of the lower limit D0, the decreasing width is varied depending on q_scale at that time. Generally, in the encoding process in a certain picture, the product of the q_scale value and number of generated bits, that is, complexity, is said to be almost constant. That is, when q_scale is half, the number of generated bits is doubled. When a relatively large value is assigned for q_scale, to control the number of generated bits by varying the value, it is understood that the degree of change must be large as compared with the case of a smaller q_scale value.

Of the I, P, B pictures, the B picture tends to have a smaller number of generated bits than the lower limit D0, and when the quantizing width is controlled from the number of generated bits of the B picture, the increase or decrease in the number of generated bits in other pictures is significant. Accordingly, by setting q_scale to such an extent that the error from the lower limit D0 may be recovered to about half, the degree of change is set so that the number of generated bits may reach the lower limits in several pictures. In the flowchart in FIG. 16, it is judged at step S281 if PIC_CNT is smaller than ½ of the lower limit D0, and if smaller, q_scale is subtracted by the value corresponding to the preceding value. That is, at step S282, if the preceding q_scale exceeds 9, 3 is subtracted at step S283. At step S284, if the preceding q_scale is judged to be between 6 and 9, inclusive, 2 is subtracted at step S285. In the case of a further smaller q_scale, it is judged whether q_scale is larger than 1 at step S286, and if the result is TRUE, 1 is subtracted from the preceding q_scale at step S287.

On the other hand, if PIC_CNT is not smaller than ½ of the lower limit D0, at step S289, 1 is subtracted from the preceding q_scale, but if q_scale is judged to be 1 or less at step S288, no subtraction takes place.

Thus, if the number of bits generated in picture PIC_CNT for a sub-set of an image segment is smaller than the specified lower limit, the quantizing parameter is subtracted depending on the difference with respect to the lower limit.

Figure 17:
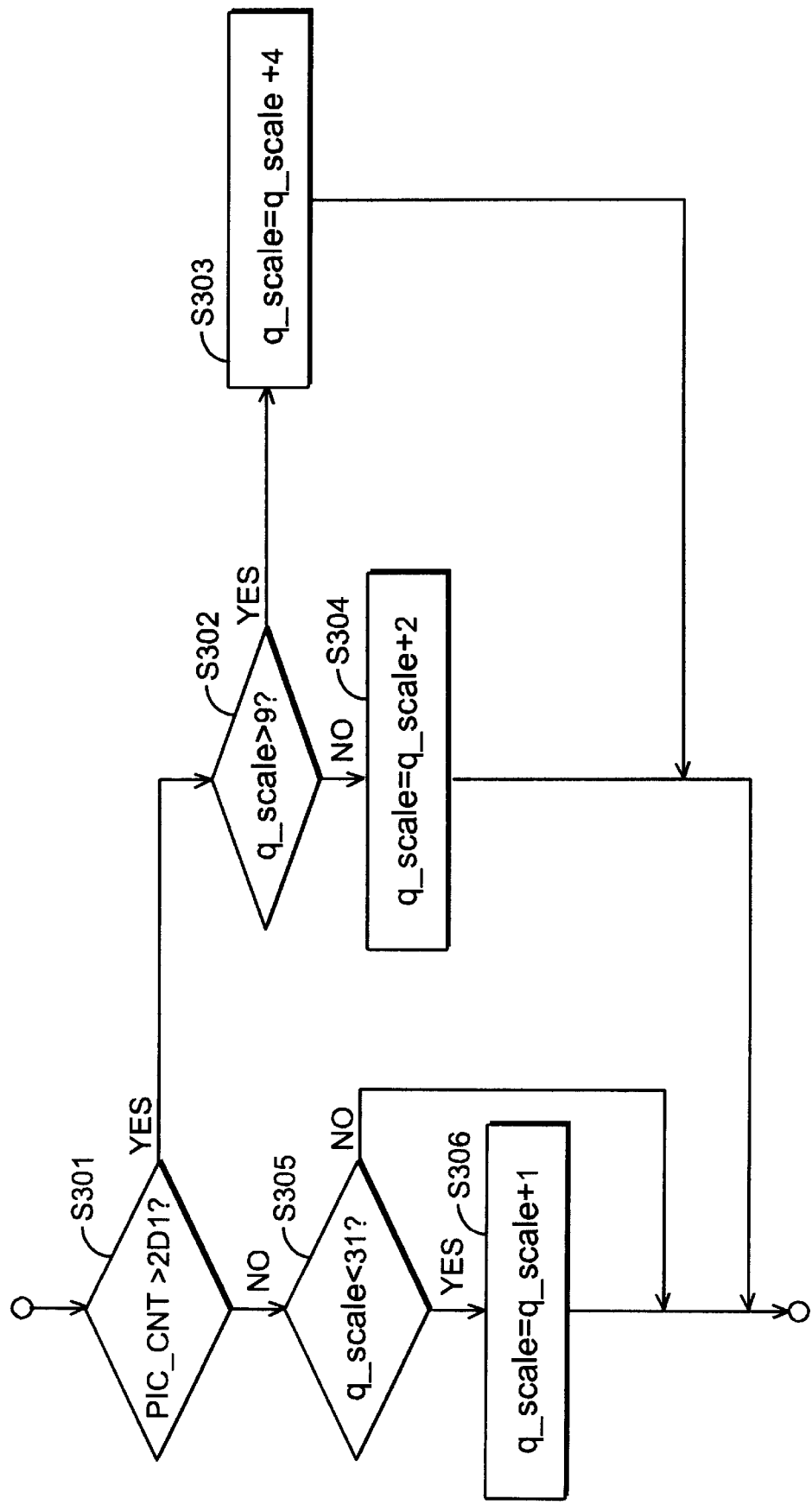

Referring back to FIG. 15, it is judged at step S29 whether PIC_CNT is over the upper limit D1, and if PIC_CNT exceeds the upper limit D1, q_scale is increased at step S30 to control the generated code amount so as not to exceed the upper limit. The process of increasing q_scale is shown in FIG. 17. That is, at step S301, if it is judged that PIC_CNT is more than twice D1, then at step S302, it is judged if the preceding q_scale is over 9 or not, and if the result is TRUE, at step S303, 4 is added to the preceding q_scale. Or, if at step S302, if it is judged that q_scale is smaller than 9, then at step S304, 2 is added to the preceding q_scale. On the other hand, if PIC_CNT is judged to be smaller than twice the upper limit D1 at step S301, then it is judged at step S305 whether the preceding q_scale is smaller than 31. If q_scale is smaller than 31, then, at step S306, 1 is added to the preceding q_scale, and if q_scale is greater than 31 the same q_scale preceding value is retained. Thus, the degree of change varies depending on the value of the preceding q_scale because a large degree of change is needed if the quantizing width is large. Besides, in the case of an I picture or scene change, the number of generated bits may temporarily exceed the upper limit, and hence the value of q_scale is changed so that the number of generated bits may settle within the upper limit in several pictures.

In this way, when the number of bits generated in picture PIC_CNT of a sub-set of an image segment is larger than the specified upper limit, the quantizing parameter is increased depending on the difference with respect to the specified upper limit.

Again referring back to FIG. 15, at step S31 GOP end timing is judged. If not GOP end timing, the control job of q_scale for controlling the number of generated bits between lower limit and upper limit is repeated in every picture. When receiving GOP end timing, the number of bits generated in GOP GOP_CNT is detected at step S32, and the error DIF_Gi from the present number of generated bits is calculated by the following formula at step S33.

$$DIF\_Gi = DIF\_Gi + GOP\_CNT - \frac{R}{\text{(number of } GOPs \text{ per second)}} \quad (21)$$

On the basis of result of the this calculation, the beginning q_scale of the next GOP is calculated. This series of operation is repeated until encoding is over.

What is characteristic of the processing discussed above is that, as compared with the first embodiment in which the complexity of the picture to be encoded must be detected from the complexity detector 4, the change of q_scale, in the second embodiment, is determined by comparing the number of bits generated in the sub-set of the image segment encoded immediately before with the upper limit or lower limit, so that the moving picture encoding apparatus is even more suitable for real time processing.

The picture skip signal issued by the control unit 223 in FIG. 14 is supplied to the encoding processor 20 to prevent underflow of the virtual buffer. The encoding processor 20 receives the picture skip signal and skips encoding for the portion of one picture.

Figure 18A:
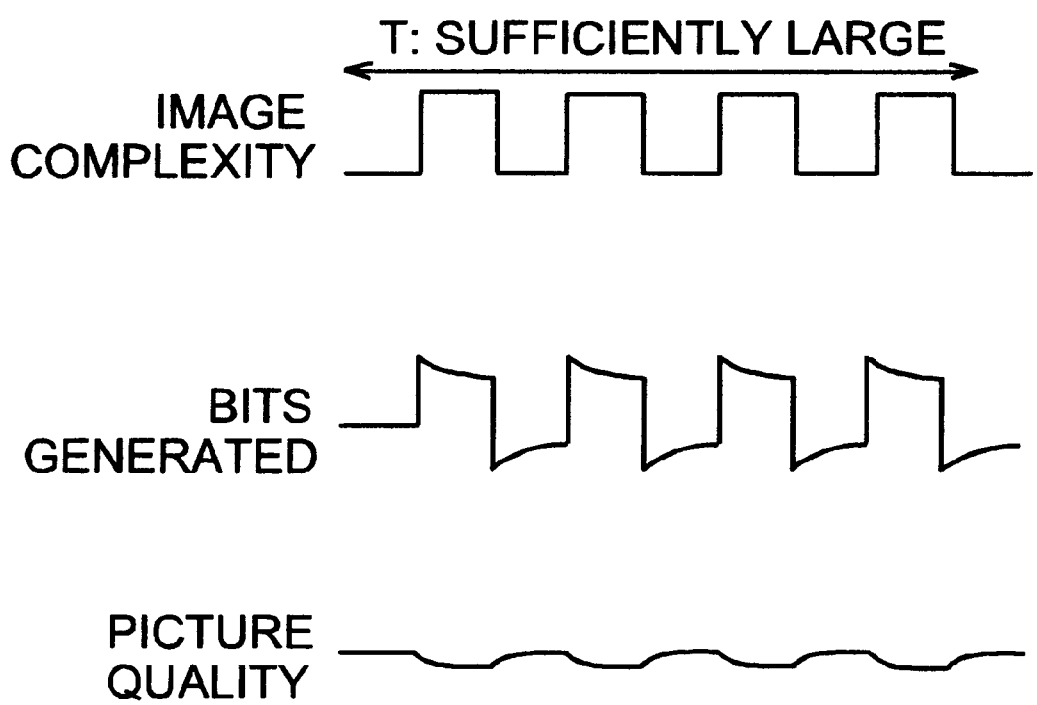

FIGS. 18a–c are graphs schematically showing changes in the number of bits generated in relation to the complexity of an input image and the picture quality. FIG. 18(a) shows the changes of complexity occurring in a sufficiently short time for the reaction coefficient T and changes of the number of generated bits and picture quality according to the first embodiment. That is, if the complexity of the image changes in a relatively short time interval, the number of generated bits is assigned depending on the complexity of encoding the image, and it is understood that the picture quality can be kept almost constant.

On the other hand, as shown in FIG. 18(b), when encoding of an input image is extremely difficult and such a signal is supplied for a relatively long time, according to the assigning method of the target number of bits of the first embodiment, the number of bits is generated depending on the complexity of the input image, and later, the bit generation amount decreases exponentially with the reaction coefficient T as a parameter. Accordingly, the number of bits decreases sooner than desired to maintain sufficient picture quality, and thus, the interval over which sufficient picture quality is maintained is shorter than desired. By the assigning method of target number of bits of the second embodiment, the image interval requiring bit generation over the maximum bit quantity is encoded quickly by a smaller number of bits than the maximum bit quantity, and a sufficient picture quality is maintained for a long period.

FIG. 18(c) is a graph schematically expressing the relation between the number of generated bits and the picture quality in the case of long duration of an image of high complexity followed by a long duration of an image of low complexity. According to the first embodiment of the invention, right after changing over to an image of low complexity, the number of generated bits decreases abruptly, and then the number of generated bits increases exponentially by the reaction coefficient T. For recovery of picture quality, however, the period determined by the reaction coefficient T is required. In the second embodiment of the invention, by contrast, the number of generated bits quickly reaches the lower limit, and a fair picture quality is maintained.

In the second embodiment, too, the error between the target bit rate and big generation is calculated within the GOP unit, but the bit generation error may be also calculated in a unit of several pictures.

The degree of change of q_scale in every picture can be also set arbitrarily so that the number of bits generated per picture may be controlled between the upper limit and lower limit.

The reaction coefficient T is explained as a fixed value in the first and second embodiments, but it too can be changed arbitrarily. That is, the reaction coefficient is set to absorb the error occurring in a certain GOP between the number of generated bits and the target number of generated bits over T subsequent GOPs and therefore, a preferred reaction coefficient T should be set depending on the actual system. For example, it is preferred to determine the reaction coefficient T depending on the total number of GOPs to be encoded, or the reaction coefficient T may be changed nonlinearly depending on time in the case of a limited reproduction time such as with an optical disk.

Figure 19:
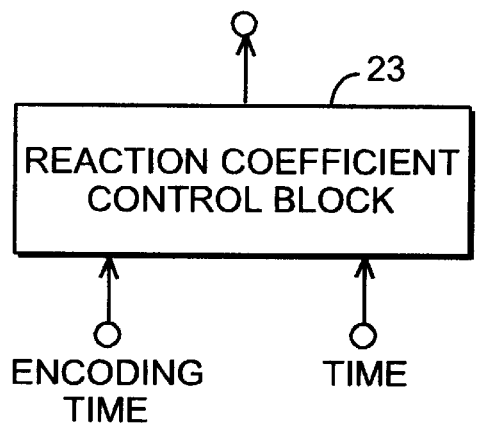
FIG. 19 is a block diagram showing an example of controlling a reaction coefficient T.
Figure 20:
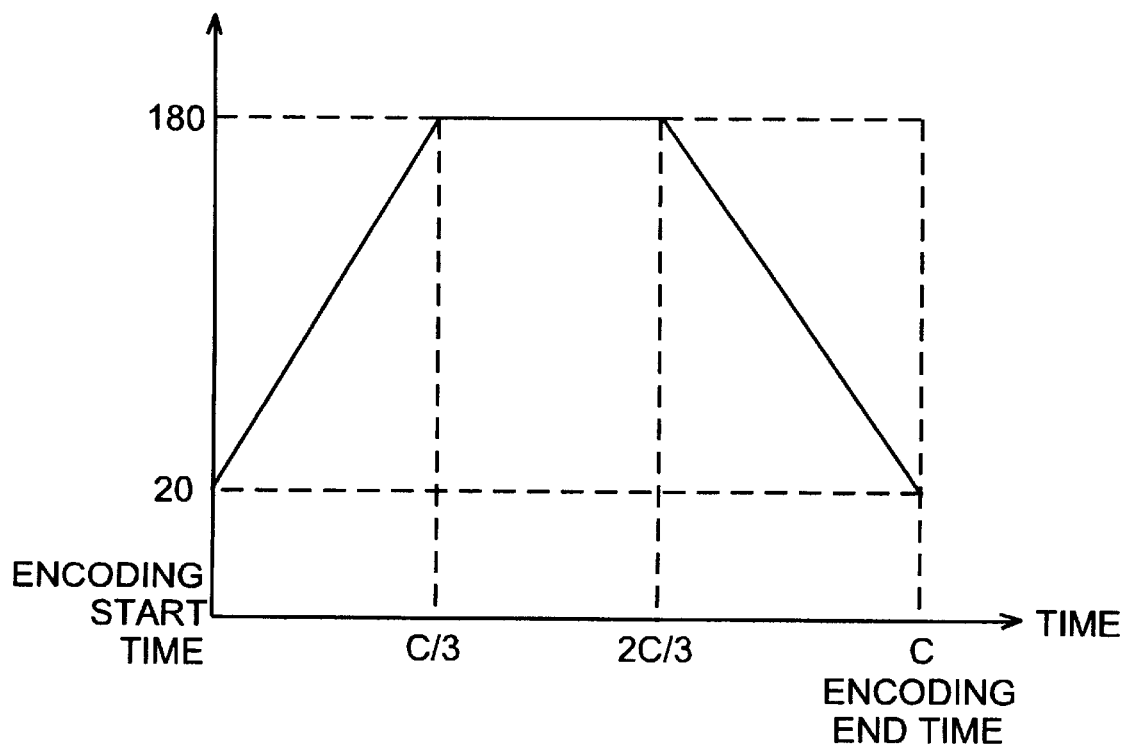
FIG. 20 is a timing chart showing an example of a reaction coefficient T.

FIG. 19 is a block diagram showing an example of variable control of reaction coefficient T depending on time, in which a reaction coefficient control block 23 issues a reaction coefficient T by receiving the encoding time of the image to be encoded, and the time on the basis of start of encoding of the presently encoded portion. FIG. 20 is a graph showing the input and output characteristics of the reaction coefficient control block 23. In this embodiment, as is clear from formula (19), when the bit generation error becomes T times the bit rate, the quantizing width is infinite and hence the upper limit of bit generation is guaranteed. That is, the reaction coefficient T is a parameter for determining the upper limit of the allowable error with respect to the target rate in the actual system. On the other hand, the larger the reaction coefficient T, the longer the interval such as a scene change, and, as such, a desired operation is realized when a larger reaction coefficient is given. For example, the reaction coefficient T can be set at a relatively large value in the first half of encoding, and can be decreased gradually at the end of encoding to a smaller value. In this way, the final error of number of generated bits is guaranteed relatively small in the finally set value of T, and in the intermediate portion of encoding, the reaction coefficient T is set large, which is preferable for a relatively long scene. FIG. 20 is a graph showing the changes of reaction coefficient T. As shown, the encoding completion time is C, the intermediate ⅓ period is T=180, and in the first ⅓, T is gradually changed from T=20 to T=180, and in the final ⅓, T is gradually changed from T=180 to T=20. Accordingly, since the reaction coefficient T is large in the intermediate portion of encoding, the error in the number of generated bits can be adjusted in a short time in the first and final portions. This is particularly effective when the beginning and end of the picture to be coded are easily encoded scenes such as the title and ending of a movie, and in the body of the movie, since the reaction coefficient T can be set large, the video source of an excellent picture quality can be presented.

In FIG. 20, incidentally, the decrease starting time of reaction coefficient T is ⅔ of the encoding time, but when scenes of relatively low complexity in encoding are expected, such as the title and the cast listing at the ending of a movie, the reaction coefficient decrease time may be set immediately before end of encoding, so that the reaction coefficient can be set at a large value throughout most of the movie, and a high picture quality can be realized.

The value of T is set between 20 and 180, but T is not limited to those values. For example, if T is about 5, it is effective to maintain the picture quality sufficiently in a scene change in which the picture quality was lowered in conventional fixed rate encoding and encoding of high picture quality is possible by increasing the reaction coefficient as much as possible as the error of number of generated bits may be allowed.

Furthermore, in the second embodiment, the changing amount of the q_scale value when the bit generation per picture has exceeded the upper limit or lower limit is controlled to be within the range of the upper limit or lower limit in several subsequent frames, assuming images of similar complexity continue. But q_scale may be also determined by calculation to set q_scale to ½ when, for example, the lower limit of the number of generated bits becomes ½, and the degree of change is arbitrary as far as the quantizing width is controlled so as to settle the number of bits generated per picture between the upper limit and lower limit.

Thus, according to the invention, since the target bits generated and the quantizing parameter are set to absorb the error between the target number of generated bits in an image segment group such as a GOP unit, and the number of generated bits approaches gradually the target number of bits assigned in a plurality of succeeding image segment groups, it is therefore possible to avoid sudden picture quality changes if the images are changed abruptly.

Also according to the invention, if the number of generated bits in a sub-set of an image segment, such as the preceding picture, is outside the range specified by the upper limit and lower limit, the quantizing parameter in the sub-set in the next image segment is changed. Therefore it is possible to control the target number of bits generated and the quantizing parameter without preliminarily detecting the number of generated bits necessary for encoding the image unit.

Various changes and modifications of the foregoing embodiments are possible so far as not departing from the scope and true spirit of the invention.

What is claimed is:

1. A moving picture encoding apparatus for controlling a quantizing parameter when compressing a picture, corresponding to a target bit rate, comprising:

a control unit for controlling the quantizing parameter as a function of dividing by at least 2 the error value between the target bit rate and the number of bits generated up to a current image segment group.

2. A moving picture encoding apparatus for controlling a quantizing parameter when compressing a picture, corresponding to a target bit rate, comprising: a control unit for controlling the quantizing parameter as a function of dividing by at least 2 the error value between the target bit rate and the number of bits generated up to a present image segment group, and varying the quantizing parameter when encoding a sub-set of a succeeding image segment, if the number of generated bits required for encoding in every sub-set of the image segment dividing the image segment group into multiple sections is over a predetermined upper limit or under a predetermined lower limit.

3. The moving picture encoding apparatus of claim 2, wherein the control unit includes means for increasing the quantizing parameter if the number of generated bits required for encoding the sub-set of an immediately preceding image segment is over the predetermined upper limit.

4. The moving picture encoding apparatus of claim 2, wherein the control unit includes means for decreasing the quantizing parameter if the number of generated bits required for encoding the sub-set of an immediately preceding image segment is under the predetermined upper limit.

5. The moving picture encoding apparatus of claim 3, wherein the control unit includes means for increasing the degree of change corresponding to the quantizing parameter used for encoding the immediately preceding sub-set if the number of generated bits required for encoding the sub-set of the immediately preceding image segment is over the predetermined upper limit.

6. The moving picture encoding apparatus of claim 4, wherein the control unit includes means for increasing the degree of change corresponding to the quantizing parameter used for encoding the immediately preceding sub-set if the number of generated bits required for encoding the sub-set of the immediately preceding image segment is under the predetermined upper limit.

7. The moving picture encoding apparatus of claim 1, further comprising an encoding processor for creating an encoded image conforming to MPEG2 as a function of the quantizing parameter.

8. The moving picture encoding apparatus of claim 2, wherein the image segment group is a GOP, and the sub-set of the image segment is a picture.

9. A moving picture encoding method for controlling a quantizing parameter when compressing a picture, corresponding to a target bit rate, comprising the steps of:

controlling the quantizing parameter as a function of dividing by at least 2 the error value between the target bit rate and the number of bits generated up to a current image segment group.

10. A moving picture encoding method for controlling a quantizing parameter when compressing a picture, corresponding to a target bit rate, comprising the steps of:

controlling the quantizing parameter as a function of dividing by at least 2 the error value between the target bit rate and the number of bits generated up to a current image segment group; and varying the quantizing parameter when encoding a sub-set of a succeeding image segment, if the number of generated bits required for encoding in every sub-set of the image segment dividing the image segment group into a plurality of sections is over a predetermined upper limit or under a predetermined lower limit.

11. The moving picture encoding method of claim 10, further comprising the step of increasing the quantizing parameter if the number of generated bits required for encoding the sub-set of the immediately preceding image segment is over the predetermined upper limit.

12. The moving picture encoding method of claim 10, further comprising the step of decreasing the quantizing parameter if the number of generated bits required for encoding the sub-set of the immediately preceding image segment is under the predetermined upper limit.

13. The moving picture encoding method of claim 11, further comprising the step of increasing the degree of change corresponding to the quantizing parameter used for encoding the immediately preceding sub-set if the number of generated bits required for encoding the immediately preceding sub-set is over the predetermined upper limit.

14. The moving picture encoding method of claim 12, further comprising the step of decreasing the degree of change corresponding to the quantizing parameter used for encoding the immediately preceding sub-set if the number of generated bits required for encoding the immediately preceding sub-set is under the predetermined upper limit.

15. The moving picture encoding method of claim 9, further comprising the step of creating an encoded image conforming to MPEG2 as a function of the quantizing parameter.

16. The moving picture encoding method of claim 9, wherein the image segment group is a GOP, and a sub-set of the image segment the is a picture.

17. A moving picture encoding apparatus for compressing and encoding a picture as a function of a target bit rate, comprising:

a control unit for setting a quantizing parameter as a function of the error value between a target number of bits corresponding to the target bit rate and a number of generated bits required for encoding an immediately preceding image segment group, a reaction coefficient T for determining an allowable range for the error, and the quantizing parameter when encoding the immediately preceding image segment group.

18. The moving picture encoding apparatus of claim 17, wherein the control unit includes means for setting the quantizing parameter at a maximum value when the error corresponds to the allowable range permitted by the reaction coefficient T.

19. The moving picture encoding apparatus of claim 17, wherein the control unit includes means for setting the quantizing parameter as a function of the ratio of the difference between the target bit rate and the result of dividing the error value by the reaction coefficient T to the target bit rate.

20. A moving picture encoding method for compressing and encoding a picture as a function of a target bit rate, comprising the steps of:

setting a quantizing parameter as a function of the error value between a target number of bits corresponding to the target bit rate and a number of generated bits required for encoding an immediately preceding image segment group, a reaction coefficient T for determining an allowable range for the error value, and the quantizing parameter when encoding the immediately preceding image segment group.

21. The moving picture encoding method of claim 20, further comprising the step of setting the quantizing parameter at a maximum value when the error corresponds to the allowable range permitted by the reaction coefficient T.

22. The moving picture encoding method of claim 20, further comprising the step of setting the quantizing parameter as a function of the ratio of the difference between the target but rate and the result of dividing the error by the reaction coefficient T to the target bit rate.

23. The moving picture encoding apparatus of claim 17, further comprising:

an input device for inputting the reaction coefficient T for determining an allowable range for the error.

24. The moving picture encoding apparatus of claim 18, further comprising:

an input device for inputting the reaction coefficient T for determining an allowable range for the error.

25. The moving picture encoding apparatus of claim 19, further comprising:

an input device for inputting the reaction coefficient T for determining an allowable range for the error.

26. The moving picture encoding apparatus of claim 17, further comprising:

a variable control device for setting the reaction coefficient T.

27. The moving picture encoding apparatus of claim 18, further comprising:

a variable control device for setting the reaction coefficient T.

28. The moving picture encoding apparatus of claim 19, further comprising:

a variable control device for setting the reaction coefficient T.

29. The moving picture encoding apparatus of claim 26, wherein the variable control device includes means for setting the reaction coefficient T depending on the time for encoding.

30. The moving picture encoding apparatus of claim 27, wherein the variable control device includes means for setting the reaction coefficient T depending on the time for encoding.

31. The moving picture encoding apparatus of claim 28, wherein the variable control device includes means for setting the reaction coefficient T depending on the time for encoding.

* * * * *